(12) United States Patent
Kitson et al.

(10) Patent No.: US 10,643,178 B1
(45) Date of Patent: May 5, 2020

(54) ASYNCHRONOUS REAL-TIME PROCUREMENT SYSTEM

(71) Applicant: Vinimaya, Inc., Cincinnati, OH (US)

(72) Inventors: John Melvin Kitson, Liberty Township, OH (US); Micky Glen Keck, Cincinnati, OH (US); Jeffrey Todd Crowder, Morrow, OH (US); Sundaresan R. Kadayam, Cincinnati, OH (US); Mark William Reed, Fort Thomas, KY (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 0 days.

(21) Appl. No.: 16/007,373

(22) Filed: Jun. 13, 2018

Related U.S. Application Data

(60) Provisional application No. 62/520,756, filed on Jun. 16, 2017.

(51) Int. Cl.
| | |
|---|---|
| *G06Q 10/08* | (2012.01) |
| *H04L 29/06* | (2006.01) |
| *G06Q 30/06* | (2012.01) |
| *G06F 16/9535* | (2019.01) |
| *G06F 16/957* | (2019.01) |

(52) U.S. Cl.
CPC ....... *G06Q 10/087* (2013.01); *G06F 16/9535* (2019.01); *G06F 16/9574* (2019.01); *G06Q 30/0635* (2013.01); *H04L 67/42* (2013.01)

(58) Field of Classification Search
CPC .............. G06Q 10/087; G06Q 30/0635; G06F 16/9574; G06F 16/9535

USPC ....... 705/28, 26.62; 707/719, 736, 711, 752, 707/999.01

See application file for complete search history.

(56) References Cited

U.S. PATENT DOCUMENTS

| | | |
|---|---|---|
| 5,317,737 A | 5/1994 | Barton |
| 5,628,011 A | 5/1997 | Ahamed et al. |
| 5,712,989 A | 1/1998 | Johnson et al. |
| 5,768,580 A | 6/1998 | Wical |
| 5,859,972 A | 1/1999 | Subramaniam et al. |
| 5,940,821 A | 8/1999 | Wical |
| 6,028,605 A | 2/2000 | Conrad et al. |
| 6,038,560 A | 3/2000 | Wical |
| 6,119,101 A | 9/2000 | Peckover |

(Continued)

OTHER PUBLICATIONS

Basware, Realize Tomorrow's Financial Goals Today, downloaded Jul. 19, 2018 from https://www.basware.com/en-us/about-basware, 2018, 20 pgs.

(Continued)

*Primary Examiner* — Vanel Frenel
(74) *Attorney, Agent, or Firm* — Hickman Palermo Becker Bingham LLP

(57) ABSTRACT

Embodiments disclosed herein provide computerized, networked procurement systems designed to interact with source sites through asynchronous, progressive scripting requests to retrieve richer data sets from websites utilizing interactive loading and multiple hyperlinked pages either with a single vendor or across a plurality of vendors. These may provide improvements on prior art systems, such as by improving the response time relative to a prior art synchronous system from 30-60 seconds to less than ten seconds.

28 Claims, 20 Drawing Sheets

(56) References Cited

U.S. PATENT DOCUMENTS

| | | |
|---|---|---|
| 6,175,830 B1 | 1/2001 | Maynard |
| 6,233,586 B1 | 5/2001 | Chang et al. |
| 6,263,342 B1 | 7/2001 | Chang et al. |
| 6,272,488 B1 | 8/2001 | Chang et al. |
| 6,330,714 B1 | 12/2001 | Hicks et al. |
| 6,370,541 B1 | 4/2002 | Chou et al. |
| 6,446,083 B1 | 9/2002 | Leight et al. |
| 6,463,430 B1 | 10/2002 | Brady et al. |
| 6,466,933 B1 | 10/2002 | Huang et al. |
| 6,484,166 B1 | 11/2002 | Maynard |
| 6,513,027 B1 | 1/2003 | Powers et al. |
| 6,556,976 B1 | 4/2003 | Callen |
| 6,578,046 B2 | 6/2003 | Chang et al. |
| 6,647,383 B1 | 11/2003 | August et al. |
| 6,650,998 B1 | 11/2003 | Rutledge et al. |
| 6,654,813 B1 | 11/2003 | Black et al. |
| 6,665,681 B1 | 12/2003 | Vogel |
| 6,728,704 B2 | 4/2004 | Mao et al. |
| 6,732,160 B2 | 5/2004 | Ambrosini et al. |
| 6,735,760 B1 | 5/2004 | Dice |
| 6,768,999 B2 | 7/2004 | Prager et al. |
| 6,772,153 B1 | 8/2004 | Bacon et al. |
| 6,778,975 B1 | 8/2004 | Anick et al. |
| 6,792,416 B2 | 9/2004 | Soetarman et al. |
| 6,792,601 B1 | 9/2004 | Dimpsey et al. |
| 6,859,937 B1 | 2/2005 | Narayan et al. |
| 6,868,525 B1 | 3/2005 | Szabo |
| 6,895,407 B2 | 5/2005 | Romer et al. |
| 6,920,448 B2 | 7/2005 | Kincaid et al. |
| 6,922,691 B2 | 7/2005 | Flank |
| 6,941,294 B2 | 9/2005 | Flank |
| 6,944,611 B2 | 9/2005 | Flank et al. |
| 6,988,099 B2 | 1/2006 | Wiser et al. |
| 6,994,612 B2 | 2/2006 | Cron |
| 7,031,961 B2 | 4/2006 | Pitkow et al. |
| 7,035,870 B2 | 4/2006 | McGuire et al. |
| 7,069,308 B2 | 6/2006 | Abrams |
| 7,073,133 B2 | 7/2006 | Hughes et al. |
| 7,085,771 B2 | 8/2006 | Chung et al. |
| 7,113,939 B2 | 9/2006 | Chou et al. |
| 7,117,214 B2 | 10/2006 | Wiser et al. |
| 7,177,818 B2 | 2/2007 | Nair |
| 7,177,879 B2 | 2/2007 | Flank et al. |
| 7,181,438 B1 | 2/2007 | Szabo |
| 7,188,153 B2 | 3/2007 | Lunt et al. |
| 7,222,090 B2 | 5/2007 | Oddo |
| 7,272,833 B2 | 9/2007 | Yaung |
| 7,330,846 B1 | 2/2008 | Dirisala et al. |
| 7,343,371 B2 | 3/2008 | Ibuki et al. |
| 7,418,444 B2 | 8/2008 | Flank et al. |
| 7,451,161 B2 | 11/2008 | Zhu et al. |
| 7,461,024 B2 | 12/2008 | Montgomery |
| 7,519,605 B2 | 4/2009 | Vailaya et al. |
| 7,536,386 B2 | 5/2009 | Samji et al. |
| 7,555,448 B2 | 6/2009 | Hsieh |
| 7,565,425 B2 | 7/2009 | Vleet et al. |
| 7,567,953 B2 | 7/2009 | Kadayam et al. |
| 7,567,963 B2 | 7/2009 | Shpeisman et al. |
| 7,610,585 B2 | 10/2009 | Shpeisman et al. |
| 7,620,572 B2 | 11/2009 | Bowman et al. |
| 7,660,783 B2 | 2/2010 | Reed |
| 7,703,030 B2 | 4/2010 | Smirin et al. |
| 7,707,167 B2 | 4/2010 | Kishore et al. |
| 7,721,192 B2 | 5/2010 | Milic-Frayling et al. |
| 7,739,218 B2 | 6/2010 | Arguello et al. |
| 7,756,750 B2 | 7/2010 | Venkiteswaran |
| 7,761,385 B2 | 7/2010 | Hutchison et al. |
| 7,801,879 B2 | 9/2010 | Jones |
| 7,860,852 B2 | 12/2010 | Brunner et al. |
| 7,865,358 B2 | 1/2011 | Green et al. |
| 7,957,985 B2 | 6/2011 | Kashani et al. |
| 7,996,282 B1 | 8/2011 | Scott et al. |
| 8,036,957 B2 | 10/2011 | Ettl et al. |
| 8,046,273 B2 | 10/2011 | Welter et al. |
| 8,051,450 B2 | 11/2011 | Robarts et al. |
| 8,055,673 B2 | 11/2011 | Churchill et al. |
| 8,060,513 B2 | 11/2011 | Basco et al. |
| 8,126,882 B2 | 2/2012 | Lawyer |
| 8,166,016 B2 | 4/2012 | Higgins et al. |
| 8,204,797 B2 | 6/2012 | Wanker |
| 8,249,885 B2 | 8/2012 | Berkowitz et al. |
| 8,266,130 B2 | 9/2012 | Jones et al. |
| 8,396,859 B2 | 3/2013 | Green et al. |
| 8,554,755 B2 | 10/2013 | Richardson et al. |
| 8,744,922 B2* | 6/2014 | Altschuler ............ G06Q 30/00 705/26.1 |
| 9,070,164 B2 | 6/2015 | Venkiteswaran |
| 9,552,597 B2* | 1/2017 | Godsey ................. G06Q 30/06 |
| 9,607,324 B1 | 3/2017 | Reed et al. |
| 9,996,863 B2 | 6/2018 | Venkiteswaran |
| 10,007,729 B1 | 6/2018 | Reed et al. |
| 2001/0014905 A1 | 8/2001 | Onodera |
| 2001/0034659 A1 | 10/2001 | Kobayashi |
| 2001/0037332 A1 | 11/2001 | Miller et al. |
| 2001/0039592 A1 | 11/2001 | Carden |
| 2002/0065744 A1 | 5/2002 | Collins |
| 2002/0077929 A1 | 6/2002 | Knorr et al. |
| 2002/0082952 A1 | 6/2002 | Johnston |
| 2002/0120685 A1 | 8/2002 | Srivastava et al. |
| 2002/0147656 A1 | 10/2002 | Tam et al. |
| 2002/0165856 A1 | 11/2002 | Gilfillan et al. |
| 2002/0194208 A1 | 12/2002 | Knoll et al. |
| 2003/0084010 A1 | 5/2003 | Bigus et al. |
| 2003/0120653 A1 | 6/2003 | Brady et al. |
| 2004/0167827 A1 | 8/2004 | Vincent et al. |
| 2005/0010561 A1 | 1/2005 | de Bois et al. |
| 2005/0027611 A1 | 2/2005 | Wharton |
| 2005/0149538 A1* | 7/2005 | Singh ................... G06F 16/972 |
| 2005/0160107 A1 | 7/2005 | Liang |
| 2007/0027811 A1 | 2/2007 | Jackson et al. |
| 2008/0040332 A1 | 2/2008 | Lee et al. |
| 2008/0275719 A1 | 11/2008 | Davis et al. |
| 2008/0281793 A1 | 11/2008 | Mathur |
| 2008/0306924 A1 | 12/2008 | Paolini |
| 2009/0157490 A1* | 6/2009 | Lawyer ................ G06Q 10/063 705/59 |
| 2009/0271212 A1 | 10/2009 | Savjani et al. |
| 2009/0327006 A1 | 12/2009 | Hansan et al. |
| 2010/0169228 A1 | 7/2010 | Rothley et al. |
| 2010/0306080 A1* | 12/2010 | Trandal .................. G06Q 10/10 705/26.8 |
| 2012/0143721 A1 | 6/2012 | Hutchinson et al. |
| 2012/0143725 A1 | 6/2012 | Hutchinson et al. |
| 2015/0262270 A1* | 9/2015 | Venkiteswaran .. G06Q 30/0613 705/26.62 |
| 2016/0140607 A1* | 5/2016 | Urban ................ G06Q 30/0277 705/14.45 |
| 2017/0161283 A1 | 6/2017 | Reed et al. |
| 2017/0366566 A1* | 12/2017 | Demirjian ............... G06F 21/36 |
| 2018/0234496 A1* | 8/2018 | Ratias ................. H04L 67/1095 |

OTHER PUBLICATIONS

BirchStreet Systems, Procure-to-Pay on Demand, downloaded Jul. 19, 2018 from https://www.birchstreetsystems.com/about-us/, 2017, 6 pgs.

CapGemini, Annual Report, 2017, downloaded Jul. 19, 2018 from https://reports.capgemini.com/2017/wp-content/uploads/2018/03/CapG_RA17_UK-2.pdf, 41 pgs.

Cheeriojs/cheerio, GitHub, Inc., 2018, downloaded from https://github.com/cheeriojs/cheerio.

Coupa Software, Inc., Why Coupa, downloaded Jul. 19, 2018 from https://www.coupa.com/why-coupa/, 2018, 25 pgs.

Determine, Inc., About us, downloaded Jul. 19, 2018 from https://www.determine.com/about-us, 2018, 12 pgs.

GEP, Who we are: About GEP, downloaded Jul. 19, 2018 from https://www.gep.com/company, 2018, 28 pgs.

Holst, C., "Infinite Scrolling, Pagination or "Load More" Buttons? Usability Findings In eCommerce," Smashing Magazine, Mar. 1, 2016, downloaded from https://www.smashingmagazine.com/2016/03/pagination-infinite-scrolling-load-more-buttons/, 23 pgs.

(56) References Cited

OTHER PUBLICATIONS

Ivalua, Inc., About Ivalua: The Procurement Empowerment Platform, downloaded Jul. 19, 2018 from https://www.ivalua.com/company/about-us/, 2018, 10 pgs.
Perfect Commerce, About Us, downloaded Jul. 19, 2018 from https://www.linkedin.com/company/perfect-commerce, 2017, 4 pgs.
PhantonJS—Scriptable Headless Browser, Mar. 2018, dowloaded from http://phantomjs.org/, 1 pg.
Proactis, ReThink Commerce, downloaded Jul. 19, 2018 from https://www.proactis.com/us/company/about/, 2018, 24 pgs.
Real-Time Computing, description, May 24, 2018, dowloaded from https://en.wikipedia.org/wiki/Real-time_computing, citing Martin, J., *Programming Real-time Computer Systems*, Prentice-Hall, Inc., Englewood Cliffs, NJ, 1965, p. 4, https://en.wikipedia.org/wiki/Real-time_computing#cite_note-3, 3 pgs.
SAP SE, Procurement and Networks, downloaded Jul. 19, 2018 from https://www.sap.com/products/e-procurement.html, 2018, 12 pgs.
SeleniumHQ—Browser Automation, Apr. 4, 2018, downloaded from https://www.seleniumhq.org/, 3 pgs.
Version 4.0 of ViniSyndicate Catalog Integration System™ for E-Procurement. Dec. 6, 2010, 2 pgs. Downloaded from ProQuest Direct on the Internet on Oct. 17, 2014.
Wax Digital Limited, A Little Bit About Wax Digital, downloaded Jul. 19, 2018 from https://www.waxdigital.com/who-we-are/, 2018, 21 pgs.
www.ask.com—Website of fetching answer to any question asked owned by InterActiveCorp. Viewd Apr. 8, 2010.
www.clusty.com—Website of combining several top search engines owned by Vivisimo, Viewed Apr. 8, 2010.
www.facebook.con—Website of social networking owned by Facebook, Inc. Viewed on Apr. 8, 2010.
www.google.com—Website of hunting for text in webpages owned by Google Inc. Viewed Apr. 8, 2010.
www.linkedin.com—Website of business-oriented social networking. Viewed on Apr. 8, 2010.
www.myspace.com—Website of social networking owned by News Corporation. Viewed Apr. 8, 2010.
www.yahoo.com—Website of knowledge-sharing for the community. Viewed Apr. 8, 2010.
U.S. Appl. No. 12/692,117, filed Jan. 22, 2010, by Reed et al.
U.S. Appl. No. 15/889,815, filed Feb. 6, 2018, by Venkiteswaran.
U.S. Appl. No. 16/016,931, filed Jun. 25, 2018, by Reed et al.
U.S. Appl. No. 16/053,157, filed Aug. 2, 2018, by Hutchinson et al.
U.S. Appl. No. 60/336,057, filed Nov. 30, 2001.
U.S. Appl. No. 61/146,967, filed Jan. 23, 2009, by Reed et al.
U.S. Appl. No. 61/146,999, filed Jan. 23, 2009, by Reed et al.
U.S. Appl. No. 61/372,688, filed Aug. 11, 2010, by Reed et al.
U.S. Appl. No. 61/418,936, filed Dec. 2, 2010, by Hutchinson et al.
U.S. Appl. No. 61/418,947, filed Dec. 2, 2010, by Hutchinson et al.
U.S. Appl. No. 62/520,756, filed Jun. 16, 2017, by Reed et al.
"Glovia Rolls Out a Powerful, Web-Enabled Configuration Solution." Business Editors and High-tech Writers. Business Wire. New York: May 16, 2001, p. 1, Retrieved via ProQuest on Feb. 27, 2010.
http://findarticles.com/p/articles/mi_hb3381/is_200011/aLn8119940/, Vinimaya Inc. (business to business online shopping services), Purchasing, Nov. 16, 2000, (p. 1).
http://findarticles.com/p/articles/mi_hb5932/is_2001 0/ai_n23885081/, Vinimaya Upgrades ViniSyndicate. (Brief Article) (Product Announcement), The online Reporter, Oct. 15, 2001, (p. 1).
http://findarticles.com/p/articles/mi_mOEIN/is_2000_Nov_6/ai_66626613/, "Vinimaya Expands B2B e-Procurement Platform to 20 Verticles; B2B Marketplaces and Suppliers Can Join the Network to Instantly Reach Fortune 2000 Purchasing Managers," Business Wire, Nov. 6, 2000 (pp. 1-3).
http://findarticles.com/p/articles/mLmOEIN/is_2000_Oct_11/aL65946458/, "Vinimaya Partners with AnswerPal to Establish B2B Content Development Arm," Business Wire, Oct. 11, 2000, (pp. 1-2).
http://kapowtech.com/index.php/about-us, "About Kapow Technologies," Kapow Technologies website, 2009.
http://www.inc.com/inc5000/2008/company-profile.html?id-200836760, "Company Profile," Inc. 5000, 2009.
Letter from PurchasingNet, Inc., May 24, 2006 (4 pages).
Vinimaya website screenshots, Vinimaya website, purported 2000, pp. 1-3.

\* cited by examiner

FIG. 3B

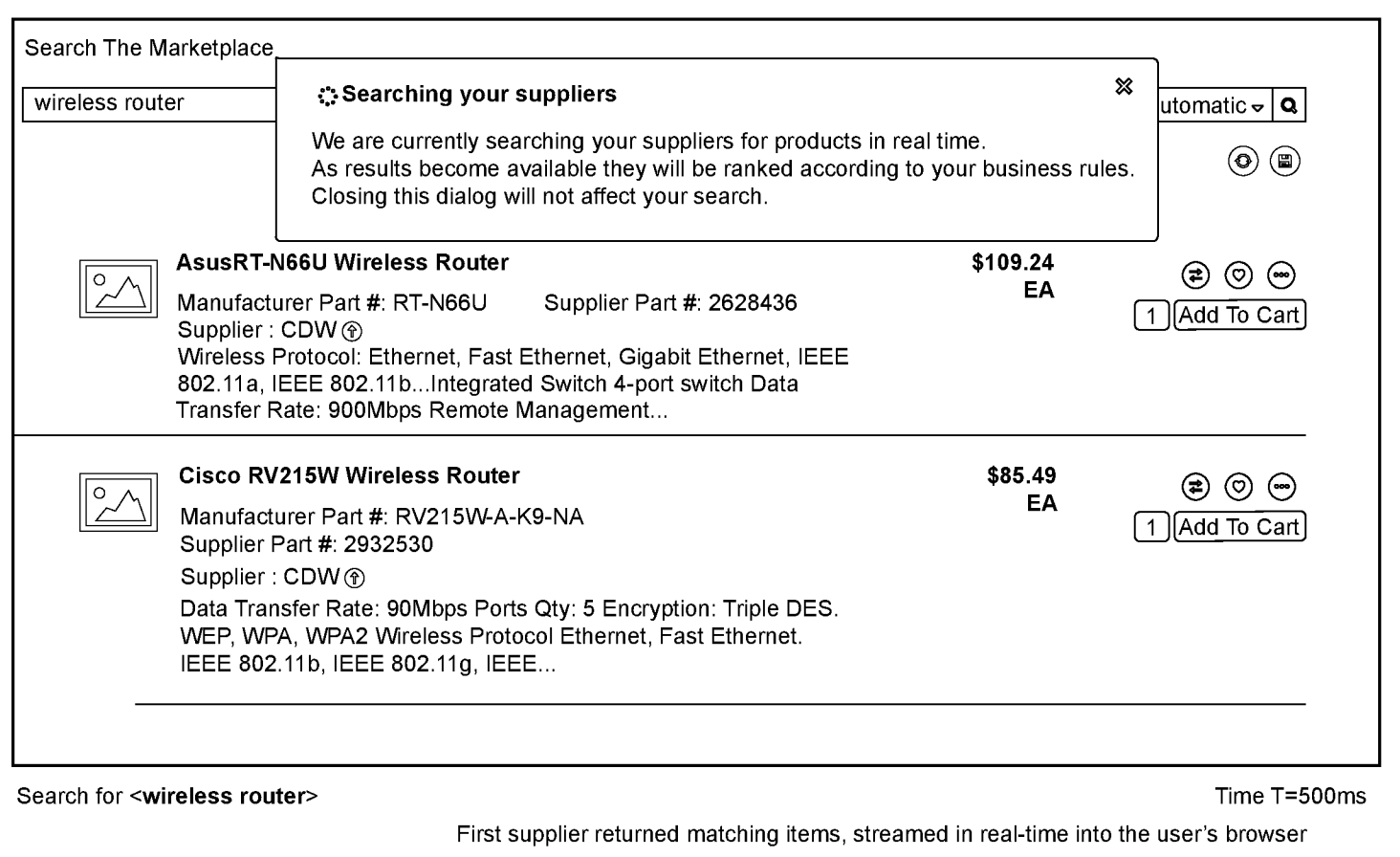

First supplier returned matching items, streamed in real-time into the user's browser Search The Marketplace

| wireless router | Automatic ▾ 🔍 |

We Found 900 Products in Networking

Asus RT-N66U Wireless Router  $109.24
Manufacturer Part #: RT-N66U    Supplier Part #: 2628436    EA
Supplier : CDW ⊕
Wireless Protocol: Ethernet, Fast Ethernet, Gigabit Ethernet,
IEEE 802.11a, IEEE 802.11b...Integrated Switch: 4-port switch
Data Transfer Rate: 900 Mbps Remote Management...
[1] [Add To Cart] ⇅ ⓘ ⊚

NETGEAR® N600 Dual Band WiFi Router  $48.99
(WNDR3400)  List Price: $66.99
Manufacturer Part #: WNDR3400100NAS    EA
Supplier Part #: 886778
Supplier : CDW ⊕
[1] [Add To Cart] ⇅ ⓘ ⊚

Netgear WNDR3700 11N 2.4GHz GBE 5-Port  $114.65
Wireless Router    EA
Manufacturer : Netgear
Manufacturer Part: WNDR3700-100NAS
Supplier Part #: 41070924  UNSPSC:43222609
Supplier : RDI ⊕ ⓘ ⓜ
[1] [Add To Cart] ⇅ ⓘ ⊚

-Supplier
☐ CDW(403)
☐ PC Connection (100)
☐ RDI (3)
☐ SHI (44)
☐ Staples (350)

-Price
☐ $10.00 to $20.00(6)
☐ $20.00 to $50.00 (31)
☐ $50.00 to $100.00(42)
☐ $100.00 to $200.00(33)
☐ $200.00 to $500.00(17)
☐ $500.00 to $1000.00(3)
☐ $2000.00 to $5000.00(1)

-Tag

Search for <wireless router>    Time T=1500ms
Four more suppliers returned matching items, streamed in real-time into the user's browser

Agent Embodiment

- AgentRequest - JSON object representing agent request sent via WebSockets
    - Search -   query, part #
    - Detail -   description, facets
    - Checkout-  UNSPSC[1], cXML values
- AgentResponse - JSON object representing response via WebSockets
    - Count
    - Filter
    - Item
    - Group

---

[1] United Nations Standard Products and Services Code (UNSPSC) is a taxonomy of products and services for use in eCommerce. It is a four-level hierarchy coded as an eight-digit number, with an optional fifth level adding two more digits.

FIG. 4

```
$(".product-table, #product-table").each(function() {
    var jqitem=$(this);
    var item={};
    item.price=jqitem.find(",dollar-amount").text().trim().replace(/\,/g,");
    item.url=currenturl;
    item.id=jqitem.find(".item-tittle").attr("href").split("/").pop();
    item.titile=jqitem.find(".item-titile").text().trim();
    item.summary=jqitem.find(".description").text().trim();
    item.thumbnail=jqitem.find("img").attr('src');
    item.link='http://www.enasco.com/product/'+item.id;
    retval.push(item);
});
```

FIG. 5

Category Management

Guided Buying Categories                         ⊕ Reset    ⊕ Clear All
*select this company's default categories*

▷ Apparel and Safety                                            ▷

▷ Automotive/Transportation                                     ▷

▷ Electronics                                                   ▷

▷ Food                                                          ▷

▷ Health and Personal Care                                      ▷

▷ Industrial and Building Supplies                              ▷

▷ Lab Equipment                                                 ▷

▷ Life Science Products                                         ▷

▷ Manufacturing Components and Supplies                         ▷

▷ Media                                                         ▷

▷ Office Products                                               ▷

▷ Plant, Animal, and Outdoors                                   ▷

▷ Services                                                      ▷

▷ Sports and Recreation                                         ▷

[Save]

Universal Categories for Guided Buying
(as managed by the Buyer)

FIG. 6A

Setting Preferred Suppliers for Categories
(as managed by the Buyer)

FIG. 7

Automated discovery of Alternate Buying Options for items in the cart

VWR - Benchtop Centrifuges

- Brand
- Model
- Maximum Capacity
- Maximum RCF
- Maximum Speed
- Supplier

Fisher Scientific - Benchtop Centrifuge

- Brand
- Capacity
- Hertz
- Max. RCF
- Max. Speed
- Max. Tube Size
- Profile (Acceleration/Braking)
- Programmability
- Refrigerated
- Temperature Range
- Temperature Range (Metric)
- Voltage

FIG. 8

Brand
- Beckman Coulter (49)
- Bel-Art Products (4)
- CELLTREAT Scientific Products (3)
- Corning (56)
- Corning.Inc. (22)
- Fisher Scientfic (7)
- HETTICH INSTRUMENTS (87)
- Kimble(7)
- Thermo Scientific (19)
- VWR (103)

Capacity (English) (fishersci)
- 0.074 oz.(1)
- 0.169 oz.(1)
- 0.338 oz.(1)
- 0.405 oz.(2)
- 0.5 oz.(2)
- 0.50 oz.(5)

Capacity (Metric) (fishersci)
- 1.5mL(1)
- 100mL(7)

FIG. 9

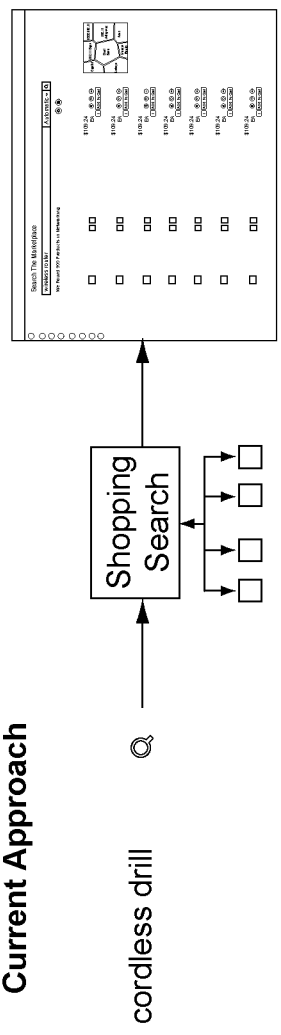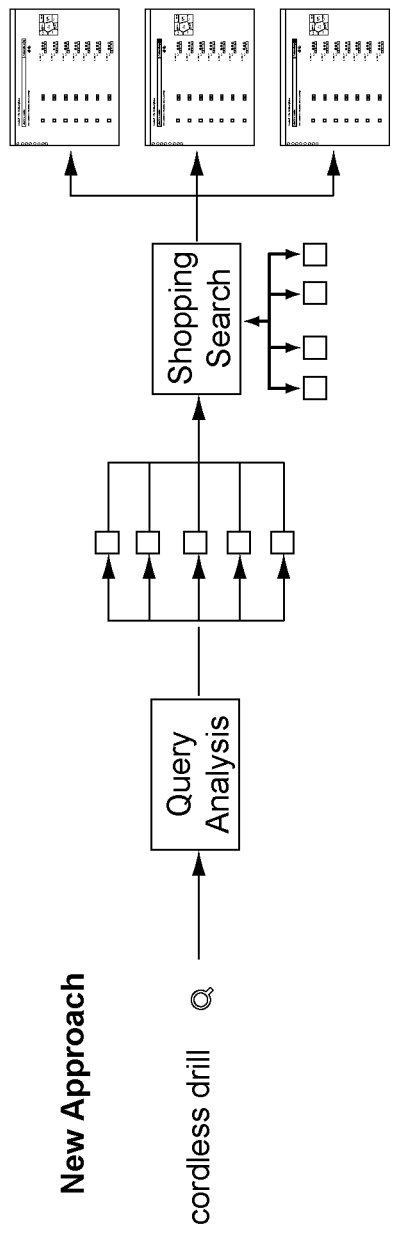
FIG. 11

Antistatic Gloves

ANSELL, CONDOR and HONEYWELL NORTH

| Item ▲ | Cuff | Color | Size | Brand | Item # | Price |
|---|---|---|---|---|---|---|
| Nitrile Material | | | | | | |
| Antistatic Gloves | Rolled | Gray/White | XS | ANSELL | 3JFP3 | $19.46 /Pair |
| Antistatic Gloves | Rolled | Gray/White | S | ANSELL | 9WRN3 | $19.46 /Pair |
| Antistatic Gloves | Rolled | Gray/White | M | ANSELL | 3JFP4 | $19.46 /Pair |
| Antistatic Gloves | Rolled | Gray/White | L | ANSELL | 8CAW1 | $19.46 /Pair |
| Antistatic Gloves | Rolled | Gray/White | XL | ANSELL | 3NGY2 | $19.46 /Pair |
| Nylon/Carbon Fiber Yarns Material | | | | | | |
| Antistatic Gloves | Elastic Rubber Band | Gray | S | CONDOR | 19L033 | $37.40 /pkg. of 12 |
| Antistatic Gloves | Elastic Rubber Band | Gray | M | CONDOR | 19L034 | $37.40 /pkg. of 12 |
| Antistatic Gloves | Elastic Rubber Band | Gray | L | CONDOR | 19L035 | $37.40 /pkg. of 12 |
| Antistatic Gloves | Elastic Rubber Band | Gray | XL | CONDOR | 19L036 | $37.40 /pkg. of 12 |
| Antistatic Gloves | Elastic Rubber Band | Gray | 2XL | CONDOR | 19L037 | $37.40 /pkg. of 12 | https://www.supplier1.com/category/antistatic-gloves/gloves-and-hand-protection/safety/ecatalog/N-ml2?searchRedirect=gloves

Antistatic Gloves

| Item | Cuff | Color | Size | Brand | Item # | Price |
|---|---|---|---|---|---|---|
| ANTISTATIC GLOVES, GRAY/WHITE, NITRILE, SIZE XS, ROLLED CUFF ANSELL | | | | | | CLOSE |

Item # 3JFP3
Mfr. Model # 11-100
Catalog Page # N/A
View all product details

List Price ⓘ
$19.46 / pair

[ 1 ] [Add To Cart]

+Add to list ☐ Compare

Expected to arrive Tue.May 23.

Ship To 60290▼ | Pick up

| Antistatic Gloves | Rolled | Gray/White | S | ANSELL | 9WRN3 | $19.46 /Pair |
|---|---|---|---|---|---|---|
| Antistatic Gloves | Rolled | Gray/White | M | ANSELL | 3JFP4 | $19.46 /Pair |
| Antistatic Gloves | Rolled | Gray/White | L | ANSELL | 8CAW1 | $19.46 /Pair |
| Antistatic Gloves | Rolled | Gray/White | XL | ANSELL | 3NGY2 | $19.46 /Pair |

Nylon/Carbon Fiber Yarns Material https://www.supplier1.com/category/antistatic-gloves/gloves-and-hand-protection/safety/ecatalog/N-ml2?searchRedirect=gloves Searched for <antistatic gloves> and got screen on left. Clicked on first product row shown in results on left screen, and same page (as evidenced by the URL being same) expands the first row to reveal more details on the first product row as shown on the screen on the right.

ASYNCHRONOUS REAL-TIME PROCUREMENT SYSTEM

CROSS REFERENCE TO RELATED APPLICATIONS

This is a non-provisional of, and claims priority from, U.S. provisional patent application 62/520,756, filed in Jun. 16, 2017. The disclosure of that application is hereby incorporated by reference in its entirety.

BACKGROUND

Field of the Invention

The present invention allows data to be imported and applied from outside sources, including by importing data from outside sources into a user interface. Particular embodiments of the disclosed technology are applied in the context of online procurement.

Description of the Related Art

The development and proliferation of richer, interactive and more robust websites has created various technical problems which are particularly apparent in the online procurement space as faced by procurement professionals. Procurement professionals are forced to choose between providing their users either static catalogs that can easily go out of date and/or are missing key information such as current inventory levels or releasing control and allowing them to shop supplier controlled B2B eCommerce sites. The two ends of the spectrum present two sets of problems:
  Hosted Catalogs
    Poor, stale supplier data
    Lack of timely insights.
  Online Catalogs
    High rogue spend
    Savings leaks A first problem presented by modern supplier website catalogs is that instead of presenting all the information on the screen in one request, they present more limited information and expect the user to interactively work with the source site to reveal the information of interest. However, traditional scraping techniques fail in this environment because measures designed to protect website security such as throttling and blocking prevent traditional scraping techniques from retrieving the additional data. This cannot be solved simply by using more powerful hardware, since the security measures that thwart attacks supported by much greater resources (e.g., distributed denial of service attacks) also resist traditional scraping techniques.

Even when a traditional scraping strategy is not blocked, it would not be feasible from a user experience perspective. To illustrate, consider retrieving data from a website that provides pages with 25 results. Most websites return results in the 3-5 second range. In turn, a typical crawl/scraping strategy would be to grab 4 pages of 25. As a result, it would take 12-20 seconds (3-5 seconds/page×4 pages) for a traditional/scraping strategy to retrieve even the top 100 results for a search. Furthermore, even with this delay, all that would be obtained is the very basic information on the search page (not what is on the detail page). To get all the detail pages would take crawling an additional 100 pages (1 per item), which would entail another 300-500 seconds of delay—a completely unacceptable amount of time for any kind of interaction that is intended to be responsive to user input. In theory, it may be possible to address this by doing a massive crawl of each of the result pages in parallel. However, in practice this type of activity has been thwarted by security measures such as mentioned previously. Accordingly, it is beyond the functional capacity of computers using traditional crawling/scraping techniques to accommodate and capture data from web sites that interactively reveal data.

Referring to FIG. 1, N Agents (e.g., as described in U.S. Pat. No. 7,756,750, which is incorporated by reference herein in its entirety) (131 . . . N) may be allocated to each of N Supplier Punchouts (141 . . . N). A given agent (e.g., Agent #3 (131C)) may make a request from a given webpage (embodied in this example as Supplier Punchout #3 (151C)). But, any information not available on this page is simply not returned or made available to the Agent Server (130) or, ultimately, to the end-user via their Client Browser (110).

Even if a supplier website provides an application programming interface ("API") to allow a set of results to be returned in response to a specific request, the API returns only the data for which it is configured and does not typically allow the user a mechanism to discover additional data even if such is available. Alternatively, crawling a rich website to retrieve all the data possibly needed and then store that data locally in a cache may result in performance degradation and stale data. Furthermore, caching may be utilized to provide more recent data for comparison purposes but will only work for items that have been actually cached (so users may not be aware of additional items available through the supplier, if the system does not display them, since such items have not been retrieved from the underlying source yet). This also takes up memory and, if large, may slow down processing time. Finally, caching each item so that it may be used in subsequent searches may result in misleading or irrelevant search results. For example, a search for "paper" might return "litmus paper" causing "litmus paper" to be stored in the cache. A subsequent search for "litmus" (a dye obtained from certain lichens that is red under acid conditions and blue under alkaline conditions) might return the "litmus paper" when the user was really seeking "litmus dyes".

Secondly, interactive websites and catalogs present issues for relevancy algorithms which are typically designed with the premise of having all the product data available before sorting begins using traditional index sorting techniques. These systems cannot handle the addition of real-time product data that enters the system asynchronously that must be sorted into a pre-existing list and updated dynamically. One way to achieve a real-time experience, with more traditional supplier catalogs, is by updating an internal cache and re-running the sorting algorithm. A more dynamic solution, however, will introduce efficiencies not currently available via caching or API calls.

A third problem relates to procurement professionals' frustration with current systems and their ability to guide end users to buying products compliant with procurement rules. However, in traditional procurement systems, users often pick a product that is more expensive or non-preferred for convenience reasons since it may be easier to find from a supplier they know. Procurement professionals want the system to check with other suppliers and suggest or enforce purchase of the compliant product. Within traditional procurement systems, alternate supplier checking can only be done against static data such as hosted suppliers or manually configured contracts. Thus, end-users may still ignore procurement rules and pick non-compliant products.

A punchout catalog comprises an ecommerce website with the ability to return a shopping cart back to a procurement system through CXML (or other formats) to allow a buyer to purchase from a supplier without having to tediously enter the product information themselves. But, products outside of punchout catalogs (e.g., on the supplier's actual website) are not available inside the traditional procurement systems and cannot be checked.

Finally, procurement professionals use static contracted suppliers to ensure best pricing for purchasing. These contracts may be revisited periodically to optimize shifts in suppliers and pricing but these occasional audits do not provide real-time, deep visibility into volatile price data to track changes as they happen and purchase the best price item either with the contracted suppliers, the open market or even similar products to capture price competition data.

Thus, improvements are called for to address issues presented by modern, interactive supplier websites.

SUMMARY

Embodiments designed to solve the problems created by modern supplier catalogs and progressive needs in the e-procurement space include a mix of technologies uniquely combined to achieve efficiencies and functionality heretofore unavailable to both buyers and suppliers. For example, some embodiments of the disclosed technology may simply retrieve an initial result page (e.g., the first 25 results, thus having a delay of only 3-5 seconds rather than 12-20 seconds to retrieve the first 100 results). Then, in such embodiments, if the user shows no interest in more items, no further results would be captured. Alternatively, if the user is interested in a particular item, an embodiment may only retrieve data for that item (again, associated with only a 3-5 second delay, rather than with a 300-500 second delay for capturing detail information for the first 100 results of a search). Technologies that may be used in various embodiments to address problems with prior art systems include:

Real-Time Dual Mode Agents (HTML or JS based in same agent)
Real-Time Cross-Catalog Relevance with a procurement controlled relevance tuner
Real-time Guided Buying
Real-time Universal Alternate Supplier Checking; and
Real-time Price Dispersion Analytics.

Embodiments in which Asynchronous, Progressive Requests Accommodate Websites which Interactively Reveal Data In an embodiment, a system for integrating a procurement system with a web-based source including content associated with one or more products, may comprise:
a procurement system which is connected to a network that is connected to one or more sources; the procurement system including:
one or more memories storing software instructions, and
one or more processors configured to execute the software instructions to perform operations including:
receiving a query for a product from an end-user of the procurement system;
searching, via a browser component, over a network, using one or more computerized agents, a web-based source on behalf of the procurement system to automatically capture a first set of product information from a first page of the web-based source, wherein said first page of the web-based source also comprises one or more items of additional information;
automatically displaying said first set of product information to the end-user through said procurement system;
automatically interacting, in the background, using one or more of said computerized agents, with said first page of the web-based source to trigger said web-based source to display (e.g., by generating data that, if sent to and processed by a browser on an end user computer, would cause the end user computer to display the relevant information) of one or more items of additional information on said first page;
automatically capturing said one or more items of additional information from said first page of the web-based source;
automatically organizing said one or more items of additional information, and
automatically displaying a set of enhanced product information, including said one or more items of additional information, in the procurement system in a format compatible with the procurement system regardless of the format of the product information retrieved from the web-based source.

The web-based source may be a punch-out. A complete set of product information, also called a product profile, may be gathered via progressive and asynchronous communication between the procurement computer system and the web-based source. The "automatically interacting" step may be repeated to trigger said web-based source to display still further items of additional information on said first page and said automatically locating, retrieving, organizing and displaying steps may also repeated until complete as per user configurable settings. Complete may equal a predetermined count of results, percentage of completion, or input/trigger from an end-user. Complete may also be linked to a percentage of relevance in the data returned. Complete may also be a time-bounded parameter (i.e., results may be progressively gathered until a preset amount of time has expired). Finally, hybrids of completion models may also be configured in the system such as an adaptive model that includes a preset time-bound parameter that may be overridden if a percentage of relevance dips below a second present parameter. The first displaying step may occur before said product profile is complete (e.g., before the data specified in the user configurable data has all been located, retrieved and organized). These settings offer further control in terms of the speed to presenting the list to the end-user's display as it more naturally mimics human behavior (or, at least, the way humans should behave when presented with potentially limitless information, cross-links, deep-links, etc.). These controls may be configured to reduce lag from falling into "rabbit-holes" of additional information.

A set of progressive requests may be made from an agent, deployed in said procurement system that may be configured with JS/JQuery scripting (or other equivalents scripting or computer-executable instructions), via a browser node to said punch-out.

Asynchronous communication may be achieved by configuring said agent to extract at least two sets of product information that are progressively requested from said web-based source.

The procurement computer system may include a federator component that reconciles at least two sets of product information extracted from a web-based source via a plurality of scripted agents.

Automatically displaying the set of enhanced product information, including said one or more items of additional information, may comprise displaying said one or more items of additional information from said first page in a different color for a predetermined length of time.

Automatically displaying a set of enhanced product information, including said one or more items of additional information, may comprise ordering one or more of said a first set of product information and said one or more items of additional information from said first page according to a set of rules-based preferences preconfigured in said procurement computer system. Said set of rules-based preferences may be preconfigured to block one or more items from being displayed as part of said set of enhanced product information. Said ordering step may be based on a set of one or more weighted factors including supplier preference, supplier item relevance, category relevance, and user preference.

Embodiments in which Asynchronous, Progressive Requests Solve Multi-Page Hyperlinked Sources In an embodiment, a system for integrating a procurement system with a web-based source including content associated with one or more products, may comprise:
 a procurement system which is connected to a network that is connected to one or more sources; the procurement system including:
  one or more memories storing software instructions, and
  one or more processors configured to execute the software instructions to perform operations including:
   receiving a query for a product from an end-user of the procurement system;
   searching, via a browser component, over a network, using one or more computerized agents, a web-based source in real-time on behalf of the procurement system to automatically capture a first set of product information from a first page of the web-based source;
   automatically displaying said first set of product information to the end-user through said procurement system;
   automatically interacting, in the background, using one or more of said computerized agents, with said first page of the web-based source to trigger said web-based source to display of one or more items of additional information on a second page of said web-based source;
   automatically capturing said one or more items of additional information from said second page of the web-based source;
   automatically organizing said one or more items of additional information, and
   automatically displaying a set of enhanced product information, including said one or more items of additional information, in the procurement system in a format compatible with the procurement system regardless of the format of the product information retrieved from the web-based source.

Said web-based source may be said web-based source may be chosen from a punch-out, a hosted catalog, or a punch-in catalog. Said "automatically interacting" step may be repeated to trigger said web-based source to display still further items of additional information on said second page and said automatically locating, retrieving, organizing and displaying steps may also be repeated until complete as per user configurable settings. The process of collecting such information (both on the initial page as well as any other asynchronous requests for further information) may comprise a number of agents that are designed to find or locate the information, pull or retrieve that information from the source and then perform any ETL (extract-transform-load) type operations to ensure that the format/structure/language or any other conventions used in the source are translated to align and/or reconciled into a cohesive body of information for organization and display to an end-user. Complete may equal a predetermined count, percentage of completion, or input from an end-user. The first displaying step may occur before said product profile is complete.

A complete set of product information may be gathered via progressive and asynchronous communication between the procurement computer system and the web-based source. Said system may permit a set of progressive requests to be made from an agent, deployed in said procurement system that is configured with JS/JQuery scripting, via a browser node to said punch-out. Asynchronous communication may be achieved by configuring said agent to extract at least two sets of product information that are progressively requested from said web-based source.

The procurement computer system may include a federator component that reconciles at least two sets of product information extracted from a web-based source via a plurality of scripted agents. Automatically displaying said set of enhanced product information, including said one or more items of additional information, may comprise displaying said one or more items of additional information from said second page in a different color for a predetermined length of time. Automatically displaying a set of enhanced product information, including said one or more items of additional information, may comprise ordering one or more of said a first set of product information and said one or more items of additional information from said second page according to a set of rules-based preferences preconfigured in said procurement computer system. Said set of rules-based preferences may be preconfigured to block one or more items from being displayed as part of said set of enhanced product information. Said ordering step may be based on a set of one or more weighted factors including supplier preference, supplier item relevance, category relevance, and user preference.

Embodiments in which Asynchronous, Progressive Requests Solve Multiple Multi-Page Hyperlinked Sources In an embodiment, a system for integrating a procurement system with a plurality of web-based sources including content associated with one or more products, may comprise:
 a procurement system which is connected to a network that is connected to one or more sources; the procurement system including:
  one or more memories storing software instructions, and
  one or more processors configured to execute the software instructions to perform operations including:
   receiving a query for a product from an end-user of the procurement system;
   searching, via a browser component, over a network, using one or more computerized agents, a plurality of web-based sources on behalf of the procurement system to automatically capture a first set of product information comprising one or more items, from two or more of the plurality of web-based sources, responsive to said query, from a first page of each web-based source searched in this step;

translating each item in said first set of product information into a format compatible with the procurement system regardless of the format of the items of product information retrieved from each web-based source;

automatically displaying each item in said first set of product information through said procurement computer system to said end-user;

automatically interacting, in the background, using one or more of said computerized agents, with each first page of each previously searched web-based source, to trigger each previously searched web-based source to display one or more items of additional information on a second page of each previously searched web-based source;

automatically capturing said one or more items of additional information from said second page of each previously searched web-based source;

automatically organizing said one or more items of additional information, and automatically displaying a set of enhanced product information, including said one or more items of additional information, in the procurement system in a format compatible with the procurement system regardless of the format of the items of product information retrieved from each web-based source.

Web-based sources may be punch-outs from a plurality of vendors.

Said "automatically interacting" step may be repeated to trigger said web-based sources to display still further items of additional information on said second page and said automatically locating, retrieving, organizing and displaying steps may also be repeated until complete as per user configurable settings. Complete may equal a predetermined count, percentage of completion, or input from an end-user. The first displaying step may occur before said product profile is complete. Each computerized agent may complete a set of product information gathered via progressive and asynchronous communication between the procurement computer system and its assigned web-based source.

Said system may permit a set of progressive requests to be made from each computerized agent, deployed in said procurement system that is configured with JS/JQuery scripting, via a browser node to said web-based source. Asynchronous communication may be achieved by configuring each of said computerized agents to extract at least two sets of product information that are progressively requested from said web-based source.

The procurement computer system may include a federator component that reconciles each set of product information extracted by each agent from its assigned web-based source with every other set of product information extracted by extracted by every other agent from its assigned web-based source.

Automatically displaying said set of enhanced product information may comprise ordering every set of product information according to a set of rules-based preferences preconfigured in said procurement computer system.

Said set of rules-based preferences may be preconfigured to block one or more items from being displayed as part of said set of enhanced product information. Said ordering step may be based on a set of one or more weighted factors including supplier preference, supplier item relevance, category relevance, and user preference.

Displaying said set of enhanced product information may further comprise harmonizing each set of product information retrieved into a set of facets to create a visual comparison of each item in each set of product information to display to the end-user wherein said harmonizing step may comprise one or more of the following steps:

cross-referencing manufacture part numbers to cross-populate facets from a first set of product information that are missing from a second set of product information;

cross-referencing a preconfigured product database to obtain facets that are missing from said set of product information; or cross-referencing at least two product descriptions from said at least two sets of product information using one or more language processing techniques to cross-populate facets from two or more sets of product information if a predetermined degree of confidence is calculated as to the identity of said at least two product descriptions.

Upon an end-user placing a first item into a shopping cart component, the procurement system may perform a price check against a preconfigured set of punch-outs using one or more facets associated with said first item to determine if said first item is available from a different vendor source for a lower price and, if so, said procurement system may alert said end-user. Said procurement system may automatically execute an instruction to replace said first item with a second, lower-priced item determined from the previous step.

Embodiments in which End-Users can Populate Shopping Carts Outside of the Procurement System A system for integrating a procurement system with a plurality of web-based sources including content associated with one or more products, comprising:

a procurement system which is connected to a network that is connected to one or more sources; the procurement computer system including:
  one or more memories storing software instructions, and
  one or more processors configured to execute the software instructions to perform operations including:
    an applet placed in browser bar which may be configured to, upon selection by an end-user:
      automatically retrieve a first set of product information for one or more items displayed to the end-user from each of a plurality of web-based sources visited by said end-user;
      translate and store each item in said first set of product information into a format compatible with the procurement system regardless of the format of the items of product information retrieved from each web-based source;
    a federation component within said procurement system which may be configured to:
      automatically organize each item sent to said procurement system via said applet; and
      automatically display a set of harmonized product information, in the procurement computer system, in a format compatible with the procurement system regardless of the format of the items of product information retrieved from each web-based source.

BRIEF DESCRIPTION OF THE DRAWINGS

FIGS. 4 and 5 represent an embodiment of pseudocode and actual code that demonstrate one possible way an Agent may be configured.

Figure 7:
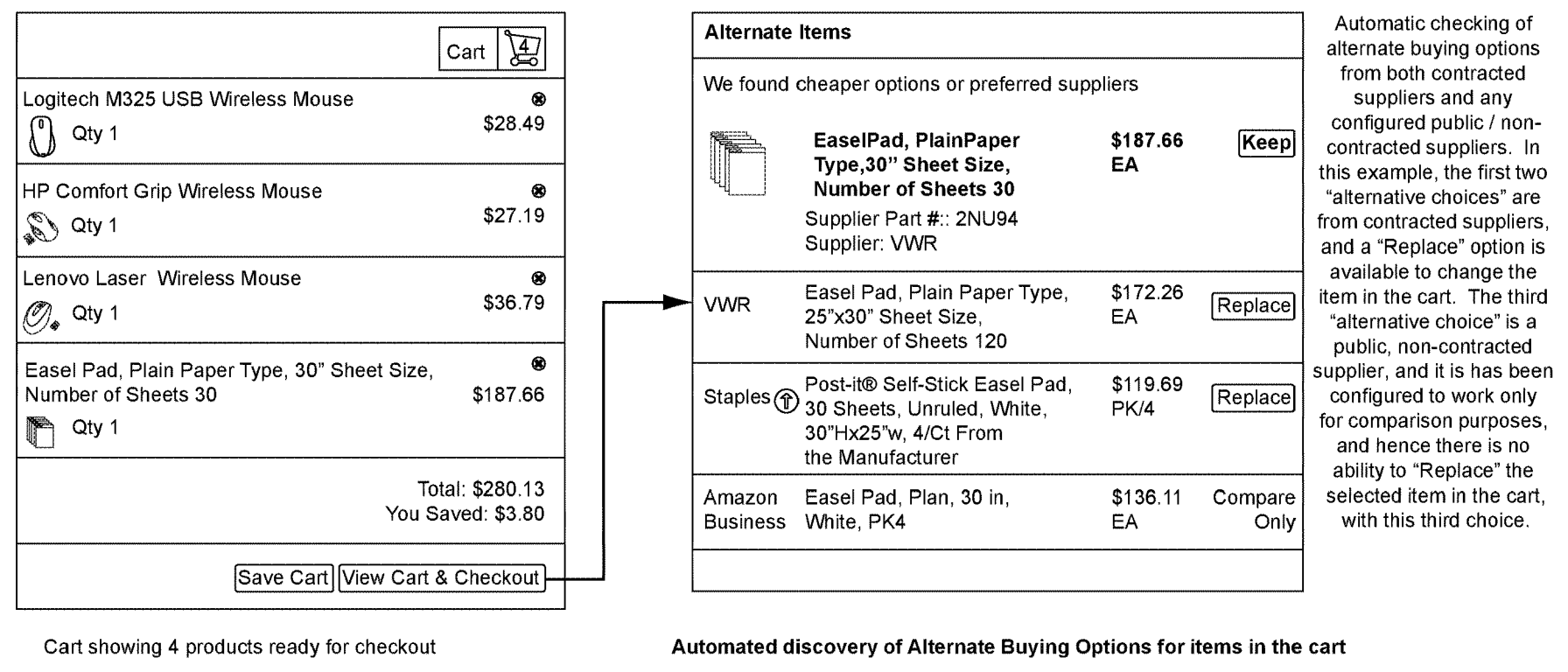

FIG. 7 represents a possible result from implementing a Price Checking component.

FIGS. 8-9 represent an exemplary set of facets which may be utilized in some embodiments.

FIG. 11 contrasts a prior art model against a Query Analysis component which may be deployed in some embodiments.

FIG. 12 represents a possible end-user experience via interactivity that may be provided in some embodiments.

DETAILED DESCRIPTION

Real time refers to a level of computer responsiveness that an end-user senses as sufficiently immediate or that enables the computer to keep up with some external process (for example, to present visualizations of a data set as it actually changes). A real-time system has been described as one which "controls an environment by receiving data, processing them, and returning the results sufficiently quickly to affect the environment at that time." (https://en.wikipedia.org/wiki/Real-time computing#cite note-3 citing Martin, James (1965). Programming Real-time Computer Systems. Englewood Cliffs, N.J.: Prentice-Hall Inc. p. 4. ISBN 0-13-730507-9). In e-procurement, the difficulty in creating a real-time system lies in coordinating multiple supplier e-catalogs, with differing information/facets, in different formats and catalog structures into a single platform which provides relevancy, compliance, accuracy, simplicity and efficiency within a single user session.

Architecture

Referring to FIGS. 2(A-C), multiple exemplary architectural embodiments are provided that achieve an asynchronous real-time procurement (ARP) system. Hybrid embodiments are also possible. Embodiments disclosed herein leverage the commonalities of websites (i.e., HTML and JS coding) and a specific extraction of data to provide immunity against changes in an underlying source. Otherwise, even a small, seemingly irrelevant, change to an underlying source such as a website (e.g., a change in header), may cause a generic model to break.

Figure 1:
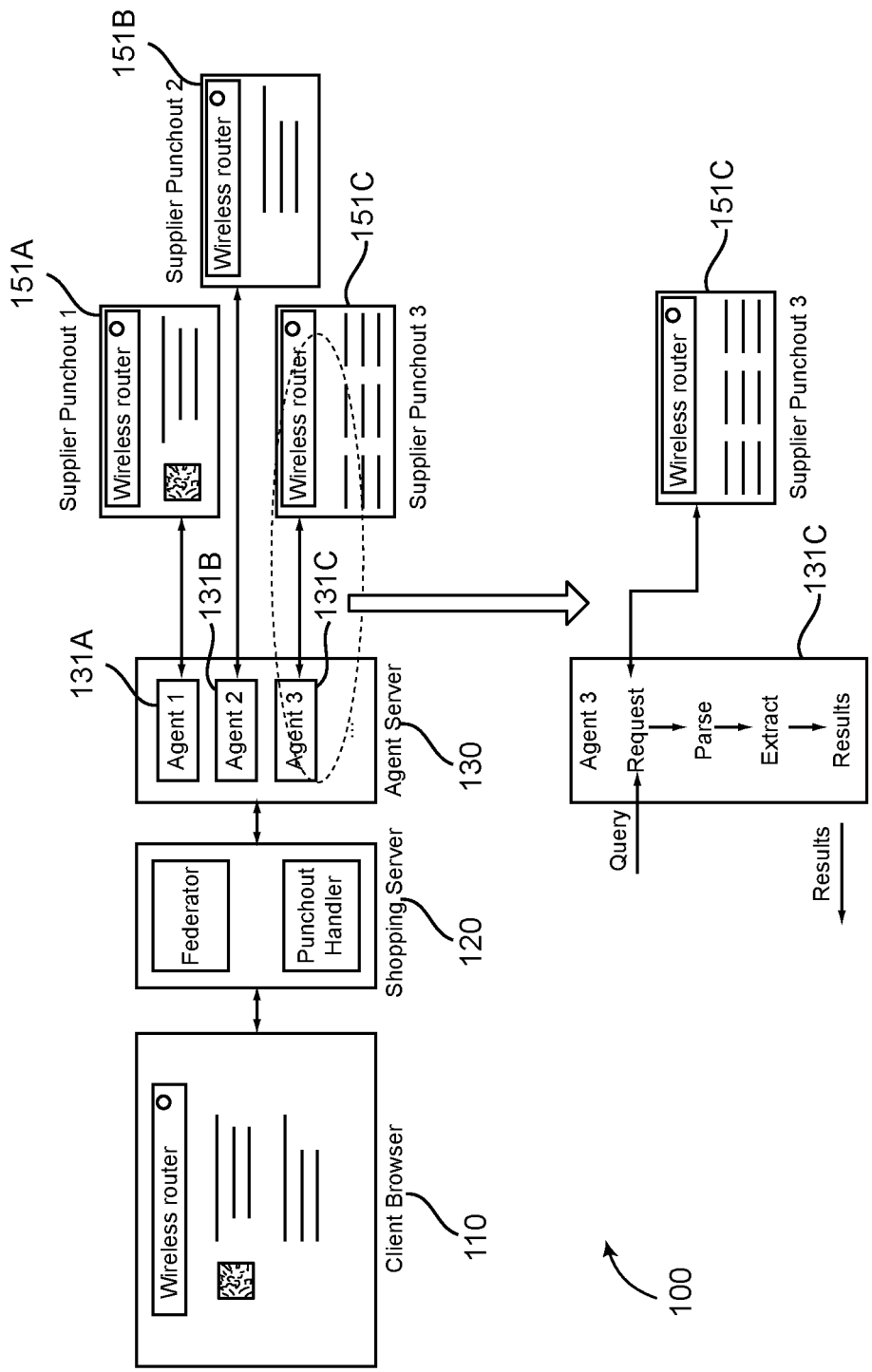
FIG. 1 represents a prior art embodiment.
Figure 2A:
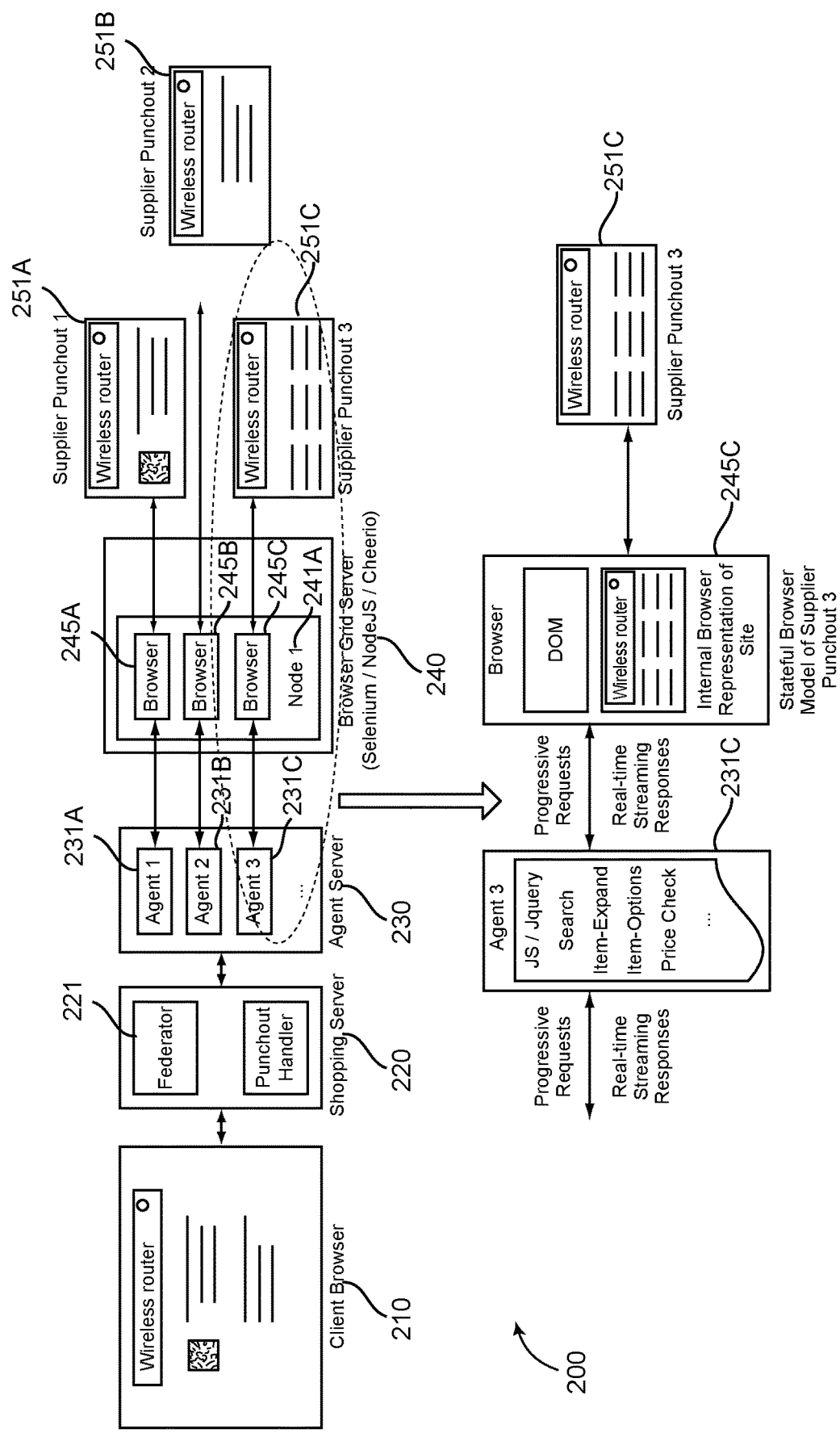
FIG. 2A represents a high-level architecture that may be used in some embodiments.

Referring to FIG. 2A, the architecture depicted in FIG. 1 has been modified to include the ability for one or more Agents (231 ... N) to interact with one or more Punchouts (251 ... N) through one or more Browser Nodes (e.g., 241A) deployed within a Browser Grid Server (240) in which each Browser Node further comprises one or more Browser Components (245A ... N). Note that, while the Agents (231 A ... N) may interact with a more typical "punch-in" catalog (e.g., a catalog comprised of items retrieved from various web-based sources and maintained on the Agent Server, on another server maintained by the entity which maintains the Agent Server, or on some other server distinct from the web-based source(s) from which the items were retrieved), enabling the Browser components (245A ... N) allows an end-user to "punch-out" to a website or other source managed by a third party entity (i.e., an entity that is different from the entity running the Agent Server (230)). Thus a "punch-out" is a web-based source run by an entity other than the entity running the Agent Server. The Supplier Punchouts (251A ... N) are depicted outside of the box housing the Browser Grid Server (240) because they are separate from the underlying system and accessed via the Internet using the Browser Components (245A ... N). Configuring an Agent (e.g., 231C) with JS/JQuery (or similar scripting) permits progressive requests to be made between the Agent (e.g., 231C) and its respective Browser Node (e.g., 241C) to the underlying Punchout (e.g., 251C).

In an embodiment, the flows may be asynchronously constructed so data can be received and processed in real-time to quickly deliver the data to the end user and permit decision making within a single session without requiring the additional time to harvest data from the underlying site. Additionally, the steps described in executing an input query, communicating with punch-outs, locating/retrieving information, interacting with the punch-outs, and displaying data may occur automatically. Automatic, as used in embodiments described herein, means, with regard to a device or process, working by itself with little or no direct human control. In some embodiments the additional processing steps may be entirely machine controlled. In other embodiments, an end-user may have a limited ability to interact with items through the ARP system (e.g., click an "expand item" button) but the system will translate that interaction into automatic commands that the agent will then execute against the web-based source. In a controlled embodiment, the speed achieved via an ARP system may return results within five (5) seconds. Conversely, a synchronous process might require thirty-sixty (30-60) seconds to provide a result. Actual return times may be dependent on processing power, speed of the underlying sites, internet connection and more. The asynchronous process will, however, return results more quickly than prior art systems (using similar external environments) because modern websites are generally single page design (meaning the page is all or mostly viewable without scrolling up or down). That is, instead of presenting all the information on the screen in one request, they present more limited information and expect the user to interactively work with the single page (e.g., via links) to reveal the information of interest. Traditional parsing techniques fail in this environment because all the data is not on the page and additional data is retrieved interactively. Within procurement systems, most product data is still held in hosted catalogs where real-time may be approximated through a punchout (i.e., where a supplier site implements an API to return results in a transactional way). One request is intended to get all information at once (even though the underlying supplier websites do not present it that way). An agent may retrieve all of the possible data in one pass which may be cached and passed through a parsing pipeline. Instead of a traditional request/response paradigm, embodiments which could be implemented based on this disclosure may make progressive requests of the agent as the end user interacts with the data. The agent is able to push data (e.g., utilizing WebSockets) as it is extracted and maintain user state such that requests and responses can flow in both directions asynchronously enabling interactive navigation and extraction of rich single page design websites.

Figure 2B:
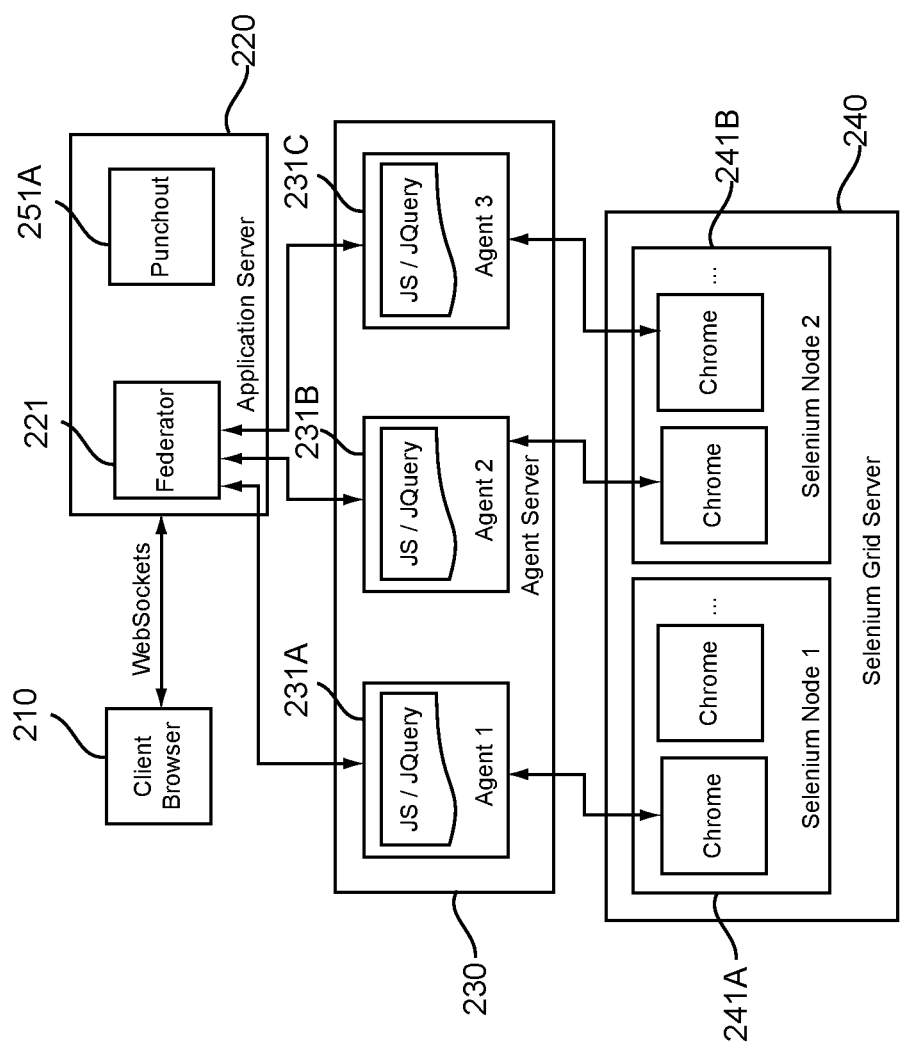
FIG. 2B represents a more specific architecture that may be used in some embodiments.
Figure 2C:
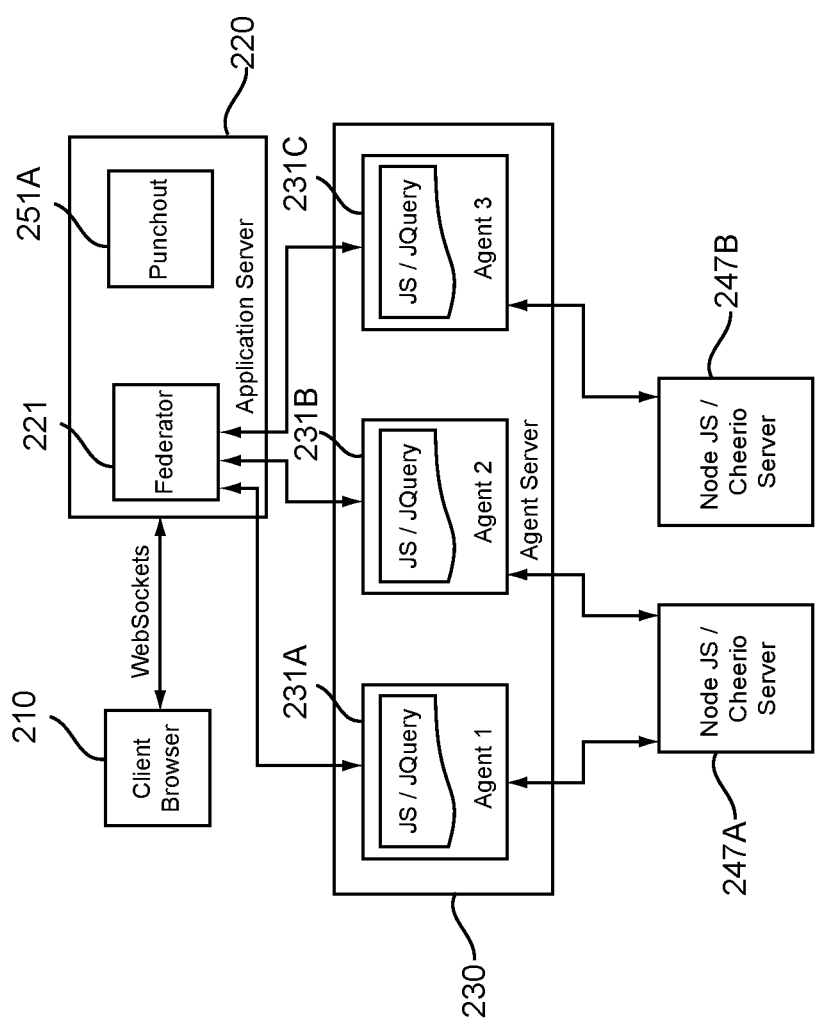
FIG. 2C represents another architecture that may be used in some embodiments.
Figure 3A:
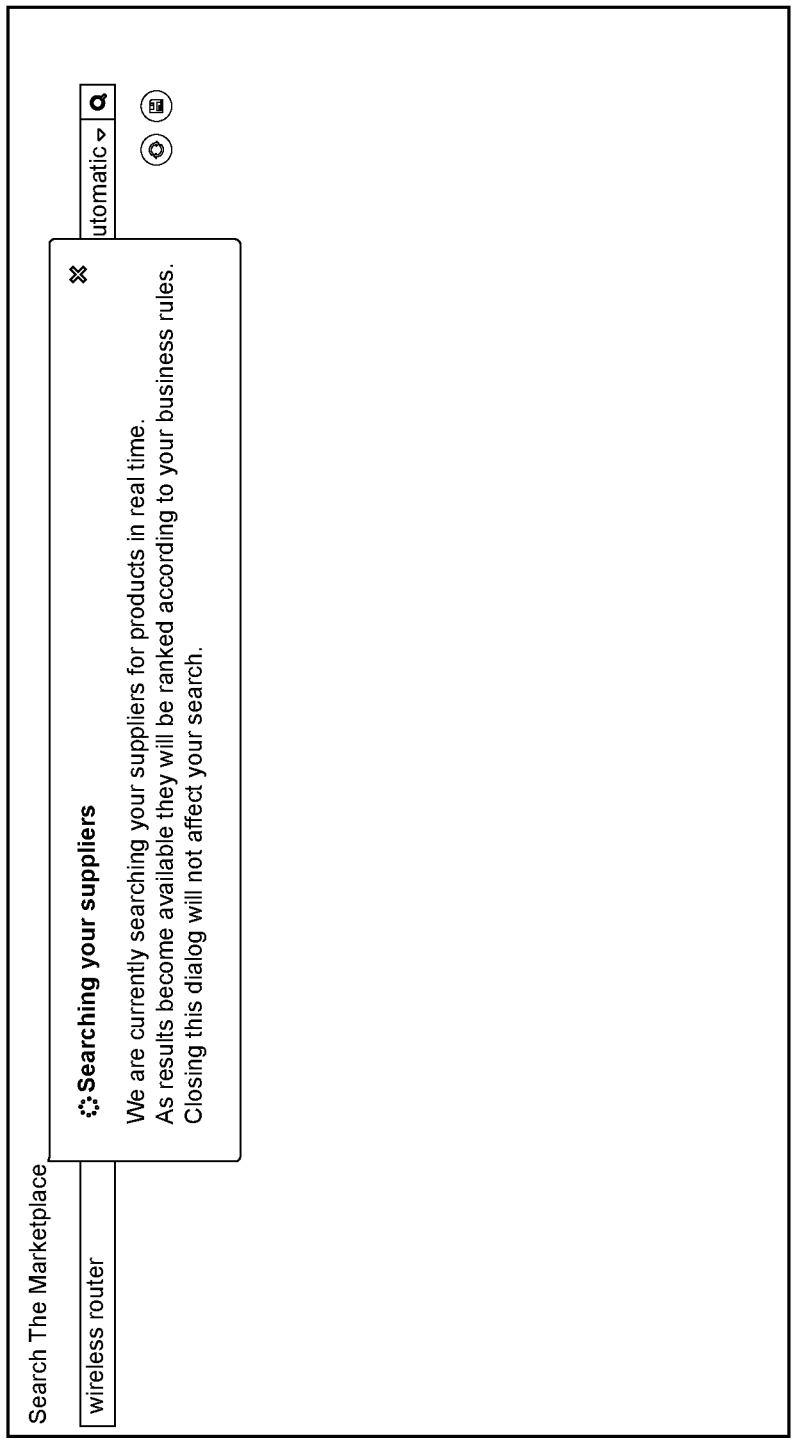
FIGS. 3(A-D) represent several screenshots taken over a discrete amount of time to display an aspect of threading results.

Referring to FIGS. 2(B-C), an architectural model may include:

A Client Browser (210)
An ARP Application Server (220) comprising a Federator (221) and one or more Punchouts (e.g., 251A)
One or more Agent Servers (230) comprising one or more Agents (231 . . . N)
Either:
  Referring to FIG. 2B, a Grid Server (240) comprising one or more Nodes (241A . . . N) each comprising one more Browser Servers (245A . . . N); or
  Referring to FIG. 2C, one or more NodeJS/Cheerio Servers (247A . . . N).

Referring to FIGS. 4-5, Agents (231 . . . N) may combine a number of technologies including WebSockets, Java, Selenium, JS, JQuery and Chrome although other variations/additions/substitutions are within the skill of the art. For instance, a different browser may be utilized other than Chrome. Another example may utilize NodeJS and Cheerio. NodeJS may provide a server side JS technology. Embodiments of a NodeJS/Cheerio system may use JavaScript so that all types of browsers (e.g., Internet Explorer, Edge, Firefox) as well as special headless browsers such as PhantomJS may be utilized in the communication stream.

One or more Agents (231 . . . N) may interact with multiple supplier sites to gather items from each site's search pages. This may be accomplished directly or even using the underlying punchout. The end user experience, however, preferably will not resemble that of a punchout experience, even when that is the underlying source, because the end user experience preferably will not jump to a supplier website. This would represent the procurement system losing control of its user. From the end-user's perspective, they will preferably remain in the procurement system even if the platform is using a punchout to get the data it needs. Another advantage to this paradigm is that the supplier site does not need to implement anything specific.

A live crawl retrieving data in real-time from a punchout search in the background solves the problem of a given supplier web site being too large or complex to realistically crawl. Results are achieved in approximately the same amount of time (e.g., a few seconds longer (e.g., five seconds) than searching the website directly so long as external factors outside the control of the platform do not interfere (e.g., slow connection speeds from the end-user). An end user gains a drastic advantage over searching the supplier website directly because they are able to view results in a single harmonized platform from multiple suppliers. Data may be gathered progressively to provide more immediate results and then updated continuously as the session continues and more data is pushed back to the ARP Server (220). In an embodiment, a limited data set might be initially returned (e.g., results from one or a limited set of pages accessible within a limited amount of time as configured according to user preference such as result set retrievable within 5 seconds). As more data is retrieved by Agents (231A . . . N), the initial result set may be updated continually. Alternatively, a "more results" feature may be provided to override the preconfigured timing restraints and perform longer searching for richer result sets in either the initial or subsequent retrieval calls. In another embodiment, "more results" may be configured to initiate an Agent(s) (231 . . . N) call to provide results from subsequent pages on the result set (i.e., many end-users do not go past the first page so many sites have moved to lazy loading or some other in-page mechanism). But even with lazy loading, if a user asks for more information, the platform can act like an end-user and retrieve the new information loaded on the page for dynamic updating of the result set in the platform.

In an embodiment, a Client Browser (210) comprises the end-user browser. Websockets (or equivalent computer communications protocol which provides full-duplex communication channels over a single transmission control protocol (TCP) connection) may be configured to support an asynchronous but bidirectional communication stream. A user interface embodied in the client browser is configured to process data pushed to it in real-time from the ARP server. In this case, Web Sockets may be used to allow the ARP Server to push items to the browser. A FederatorRequest/FederatorResponse object may be used for communication. The object may utilize XML, JavaScript Object Notation (JSON) or other equivalents to structure the data exchanged between the ARP and the user interface.

In an embodiment, an ARP Server (220) may utilize an interactive, asynchronous data extraction to make progressive requests of Agent(s) (231 . . . N) as the end user interacts with a procurement platform. Agent(s) (231 . . . N) may push data back to the ARP Server, as such data is extracted and maintain user state such that requests and responses can flow in both directions asynchronously, enabling interactive navigation and extraction of rich single page design websites. Referring to FIGS. 3A-D, from the perspective of an end-user, however, the resulting user interface appears to be a harmonized, universal view of search across multiple sources (e.g., punchout websites, hosted catalogs, cached results, etc.) in a single search. This eliminates the need for punchout catalogs providing greater flexibility to suppliers as they can focus on their core website functionality without having to create and maintain specific punchout catalogs customized by contract with each of their end-customers.

Within the ARP Server, a Federator (221) may combine data from multiple Agents (231 . . . N). As new results are received, a Federator (221) may order items and generate combined facet information. An ARP Server may also provide punchout functionality to get punchout uniform resource locators (URLs) to pass along to the Agent(s) (231 . . . N). Agent(s) (231 . . . N) may also manage customer specific items like punchout but, in a preferred embodiment, having an ARP Server perform the punchout keeps Agent(s) (231 . . . N) stateless so they simply do an extraction and are done. Additionally, it is preferred for the ARP Server to cache the startURL so each subsequent agent request does not require a new startURL to maintain performance. In another embodiment, the Agent(s) (231 . . . N) may also be utilized to search locally stored catalogs so that the user gets integrated search results (including item details) from all suppliers in one place and the ability to purchase the items across multiple disparate suppliers and/or local catalogs as if the entire resultset was within a local catalog.

One or more Agents (231 . . . N) may run within an Agent Server (230) that may run in a separate environment form the ARP Server (120). One or more ARP servers (220) may access Agents (231 . . . N) running in an Agent Server (230) thereby sharing those resources across multiple end-users.

Centralized agents (versus distributed agents customized for each end-user customer) creates efficiency through sharing resources that are also easier to maintain. In a preferred embodiment, a platform may comprise agents matched to a given supplier site. Any changes to the supplier site that "break" the system may be fixed and that fix will allow the agent to work again across all end-users. In this way, many end-users across multiple, disparate end-clients may utilize the same agent since it has been configured to work with a specific supplier site but may be customized with the end-users preferences with regard to that interaction.

Referring to FIG. 2A, an AgentRequest/AgentResponse object, delivered via an Agent API, may be used for communication via Web Sockets between the ARP Server (220) and the Agent Server (230). Agents (231 . . . N) may be configured as stateless entities (meaning there is no record of previous interactions and each interaction request has to be handled based entirely on information that comes with from a Federator (121)) although it may comprise an agent document with selectors to pull data from web pages. In an example embodiment, jQuery selectors embodied in a JS/JQuery based agent document may be used to "find" (or select) HTML elements based on their name, id, classes, types, attributes, values of attributes and much more through an API that works across a multitude of browsers. For example, if the total count is in an element like <span id='totalcount'>1000</span>, then the agent would have a jQuery selector like $("#totalcount").text( ) to retrieve the total count of results.

As results are returned to the ARP Server (220), they may be stored in a resultset cache instead of an item cache. This prevents the injection of low relevance items into the system for all types of queries.

A Grid Server (240) may support large numbers of browsers on a machine or spread across a cluster of machines. Since real-time works best with massive parallelism, a Grid Server (240) allows parallel real-time searches across multiple machines. In an embodiment, a Selenium Grid Server and Nodes may be utilized to achieve a real-time experience via a rich JS-based site through a browser. In one embodiment, a Grid Server (240) may be configured with Selenium based Chrome Browser extensions due to popularity (although any browser extensions may be configured within a Grid Server (240) to achieve broad browser capabilities). Alternatively, a NodeJS/Cheerio Server (241 . . . N) may be utilized instead of a Grid Server (140) if full browser support is not needed (e.g., if a given webpage does not load data dynamically via AJAX). Also, a combination of these technologies may be utilized in a hybrid environment to provide both scalability as well as increased speed wherever possible.

Figure 6B:
FIGS. 6(A-B) represent an example of Guided Buying that may be provided in some embodiments.

In an embodiment, a search may execute as follows:
A user may execute a search causing all relevant suppliers to be searched;
  Hosted catalogs and punchout catalogs may be treated the same for this requirement;
Results may be returned on a short but configurable time delay to allow more result sets across a multitude of suppliers to be retrieved and processed—in an alternative embodiment, a preferred supplier may merit further delays on presenting the result set;
If any results take longer than the preconfigured amount of time to return, the user interface may present the user with a notification stating "xx results from supplier1, supplier2" where xx is the number of items and suppliers will be added in order to the end of the notification;
  Clicking this notification will thread the new results into the current result set and will take the user to the top of the results list
  New results may have a visual cue such as a different background color that may fade to the normal background after a predetermined amount of time
  Referring to FIGS. 3(B-C), as the interaction progresses, the order of items dynamically changes to provide different results; rather than paginating new results, asynchronous results returning from multiple suppliers will be threaded into the result set (see, https://www.smashingmagazine.com/2016/03/pagination-infinite-scrolling-load-more-buttons/)
Standardized facets may be presented to the end user, the end-user may need to interact with that item to be presented with additional supplier specific facets.
Referring to FIGS. 6A-B, some sites have "groups" of items since the search itself is too generic to provide the user useful results (i.e., the search term "drill" may retrieve cordless drills, corded drills, hammer drills, drill bits, drill accessories, etc.). When these are returned from an Agent (131 . . . ), the grouped item may be presented with a different look so the user knows some interaction is needed to provide more detail. If the user interacts with these items (e.g., clicks Expand), the Agent (131 . . . ) may automatically collect the items from the supplier's site and "fold" those items out onto the screen directly below the Group Item unless some items have been blocked/preferred by the customer and then these will be handled per such rules.

Real-Time Cross-Catalog Relevance with Tuning

In an embodiment, a platform uses a unique stream-based relevancy technique where each product item is sorted based on supplier and item relevance as it enters the system. Supplier and item relevance may be determined via a core configuration set through a user interface by an end-user which identifies desired suppliers, categories, and items. Results may be customized on-the-fly using other filters but the core configuration serves as the starting point.

This supports the asynchronous addition of items. The resulting data is streamed to the interface with position information so items may enter the system in any order but be presented to the user in preferred relevance order. The algorithm may be configured with multiple weighted factors including supplier preference, supplier item relevance, category relevance, and user preference. An initial configuration, based on empiric testing, may be initially set. In an embodiment, each factor may be prioritized on a scale of 0.000 to 1.000 and then each factor may be further weighted according to user preference (e.g. 20%) to compute a score which will present results in a certain order. In another embodiment, tuning may be achieved via a Supplier Tag Priority Score calculates a score based on a template of attributes that may be configured for each supplier (e.g. minority owned business) with an associated priority that translates to a score. In an alternative embodiment, a Supplier Relevance Score may be calculated based on the matching count normalized to total number of items (i.e., score quantifies the quality of coverage for a query for a supplier or do they have a lot of items for a query?) A Supplier Category Relevance Score may be used based on human categorized suppliers and automated item categorization. This score quantifies how well the results match the categories assigned to that supplier. In another embodiment, a Query Category Relevance Score quantifies how well the results match the category for the query based on automated query categorization and automated item categorization. The scores may be combined using a configurable weighted system (one company might weight tag priority high, another might weight query category high). Ultimately, this provides a combined supplier score which may be used to meld the results from multiple suppliers together in a way that balances supplier preference and supplier relevance.

One difficulty in harmonizing results from different catalogs (local+external supplier; competitive suppliers; etc.) is that each catalog may store its items with different sets of facets. Facets may represent a conceptual grouping of features under a specific umbrella category (e.g., the facet "height" might include a variety of measurements from which one or more may be selected to create a specific filter on the result set. Referring to FIG. 8, the facets for "benchtop centrifuges" at two different suppliers (VWR and Fisher Scientific) are listed. While there may be overlap (sometimes same information but different labels), creating a harmonized picture of results from multiple suppliers runs into the difficulty of discerning facet names, substance, conversions, etc. Custom facets present even greater difficulty to allow a user to efficiently analyze the similarities/differences between two items. In an embodiment, an initial pass may pull information from standard facets that most sites have (e.g., supplier, price, brand, etc.) and unify/harmonize that information as different suppliers may have endless ways of depicting information on an underlying source. Among these ways are multiple and disparate eCatalog formats (such as CIF, ebXML, xCBL and others), syndication approaches (e.g., OBI, cXML "punchout"), technologies (e.g., XML, EDI), and taxonomies (e.g., UNSPSC, eClass) available. In an embodiment, data may be unified through one or more harmonization passes:

If two supplier sites sell the same product with the same manufacturer part #, that data can be unified and cross-referenced.

If two supplier sites sell the same product but with different manufacturer part #s, a user may interactively create a cross-reference table of supplier part #'s between two or more suppliers. Cross reference table includes information that part #123 on supplier site 1 is the same as part #456 on supplier site 2. With this cross-reference, data can be unified by equivalent part #.

Natural language processing with equivalency: Product titles may include common words that can be used to infer comparability. Higher word overlap indicates higher confidence of comparability. With rich agents, this comparability can also be done on detailed description data. Brand name extractors can further recognize equivalency.

Additional facets may be presented with an indicator that such facets are unique to the specific supplier. In an alternative embodiment, text mining can be utilized to "fill in" missing facets to allow for a richer comparison of items. Other embodiments may utilize categories to "fill in" missing facets as categories are generally part of the structured data present in an e-catalog. Finally, facets that are not readily apparent from an early query (e.g., price which may only be revealed interactively after multiple clicks) may be surfaced at a later point in the interaction. Thus, a facet may become dynamically available while the user is interacting with the platform.

In an embodiment with a single supplier, if the result set is filtered to a specific supplier, all available facets may be shown in the user interface (note from FIG. 8 that Fisher Scientific provides more facets than VWR). In a multi-supplier embodiment, referring to FIG. 9, an interface may allow end-users to filter based on facets available across the result set or specific to a given supplier (e.g., specific metric measurements are available for filtering specific to Fisher Scientific products).

Real-Time Guided Buying

Figure 10:
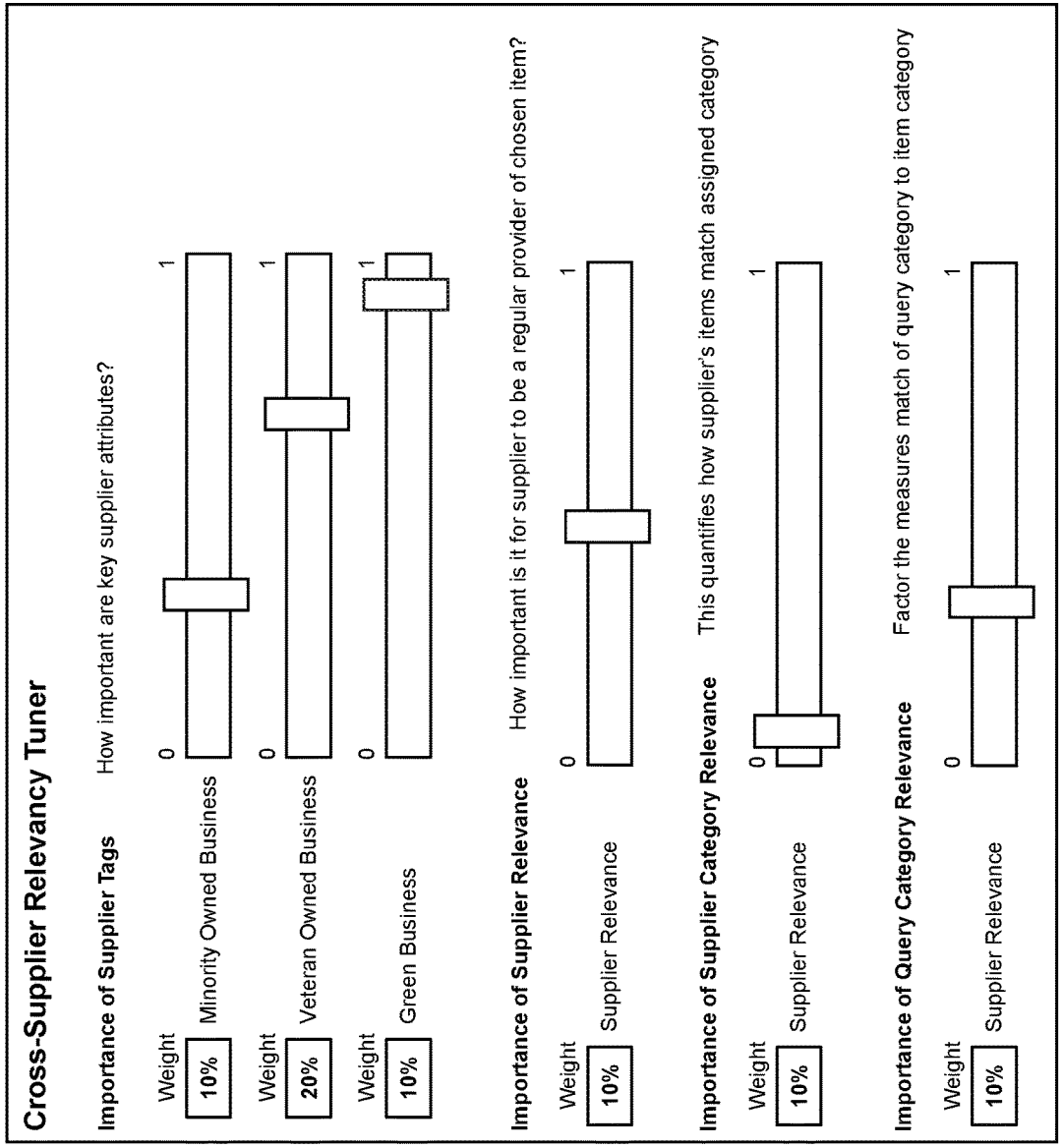
FIG. 10 represents a possible embodiment of a user interface for setting relevancy weights.

Referring to FIG. 10, in an embodiment, a hybrid approach may combine traditional supplier based buying rules with machine learning based adaptive categorization to direct an end user to the best product. These machine learning based categories may be trained with traditional categorization (such as UNSPSC), but can learn keywords and other text based cues to direct the user to the appropriate suppliers and product items without explicit configuration of those categories and items. An embodiment may rely upon sorting from a specific supplier but weight suppliers, so a result set might show Staples results higher for office supplies and Fisher Scientific higher for lab equipment. Suppliers are tagged with categories. A query may be classified to a category based on automated classification or manual override. A component of the relevancy score may be category relevance which is based on a match between supplier categorization and query categorization so that an item with matches in these areas may be weighted at a higher value. This also allows the platform to both maintain supplier item order and also intermix results across suppliers in any order configured by the end-user even if supplier results from a second supplier are received later than results from a first supplier. Later arriving results from the second supplier may be placed between earlier results from a first supplier. Thus, if more relevant, a result from a second supplier might be placed between two results from a first supplier.

In another embodiment, a preset list of universal categories may be configured to work across a multitude of customer needs or even industries. These categories may be turned off/on to allow for a coarser filter set according to user preference. Each supplier may be mapped into the pre-selected universal categories. A supplier can self-identify their categories. And the customer can override (so Staples might say they sell Computer Equipment, but a customer could override that to not use Staples for computer equipment). A supplier can also be set as a preferred supplier in a category to boost its relevancy. A query classifier may identify the category of a query. The classifier can be trained with past purchase data using UNSPSC classification. It can also use the supplier site's own classification mapped to a preselected set of categories or determine a set of classifiers based on text mining. Through categorization and classification, a user may be guided to a more finite set of relevant results.

Referring to FIG. 11, a Query Analysis module may analyze the query for a product, find what likely query type it is, and also looks up related user context such as location, user role as available, and consult guided buying rules, and with it, select a guided-buying-handler. A query for a product may include one or more agents that may be configured to perform various functions including keyword search, part-number search, an expand (i.e., expand a "parent" product to reveal a more detailed list of sub-products or related products), a detail page on a specific item, a next page request, a checkout to the cart. A Guided Buying Handler may be provided from all the inputs needed from the query analysis. It may select a template, which includes category pages that might be relevant, eforms that might be relevant, policies that might be relevant, packages/bundles that might be relevant, a set of suppliers to search, relevance criteria, and such, and launches the search process, and assembles the results into a format that is also part of the template.

Administrative interfaces may be provided to set up and manage guided buying rules suitable for a given company.

Real-Time Universal Alternate Supplier Checking and Real-Time Price Dispersion Analytics In an embodiment, once an end-user selects an item for purchase and adds it to their cart, the ARP server (220) may initiate a call to Agents (231 . . . N) to run a search across all suppliers using key product attributes such as suppler, part #, and price to search for alternate products to find, suggest (and even enforce) the purchase of items consistent with procurement rules (such as the best price item). Machine learning may be achieved to allow comparison across items with different names or even comparable items by loading historical purchase data and tokenizing it into terms and UNSPSC categorization. Category based classifiers which recognize varied terminology and word form may be built using, for instance, a variety of classifiers. In an embodiment a modified Naïve Bayes classifier may be utilized. A Naive Bayes classifier assumes that the presence of a particular feature in a class is unrelated to the presence of any other feature. The ARP Server may further track price history and present graphs to educate end-users with a picture of price volatility for a given item or type of items over a certain period of time.

Referring to FIG. 12, in an embodiment, when a user adds an item to a shopping cart, the ARP Server (220) may pull the manufacturer part number and run a search on all the suppliers that were queried in the original search. Matches (either exact, approximate or "similar enough" based on configuration of this embodiment), an algorithm may be configured to present or even substitute the new item for the item originally placed in the cart. For instance, one algorithm may be configured as follows (with variations on this theme according to user preference):

If Manufacturer part number match and
  Unit of Measure is a match and
    Price is within 50% of the item added to the shopping cart.
    Price is lower than the item added to the shopping cart or item is from a preferred supplier
  Present item with pop-up window: "We found your item is also sold by other suppliers, please confirm if you would like to change your supplier."

The ARP Server may log if the user switched sources and, if so, which item the user selected to enable tracking of the benefits of this feature. Other intelligence may be calculated and presented related to price dispersion. A bar chart may be created showing the top 100 products configured in the analytics server (from left to right). Each product is basically a stacked bar with the bottom bar in the stack being the min price and it has the dispersion above it (so the total bar is the max). This gives a quick visual of price dispersion across the training set. Hovering could show details (min price, actual price paid, max price). The bar chart may be configured to allow interaction from the user so that if it is clicked, a filtering means focuses on that bar (or portion thereof) to send a request against one or more supplier sources in real-time to perform a price check.

Real-Time Porting of Shopping Items from a Disparate Source with Rules

Figure 13A:
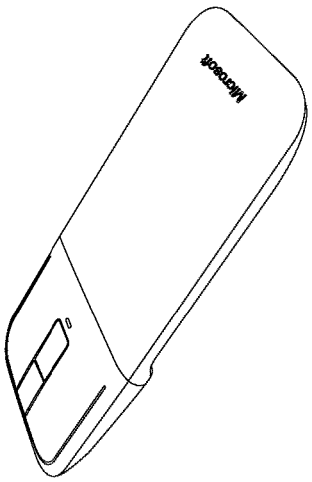
FIGS. 13(A-B) provide example screenshots of an embodiment in which an end-user can utilize an applet to port an item from a source website to a shopping cart associated with a different entity than the one associated with the source website.
Figure 13B:
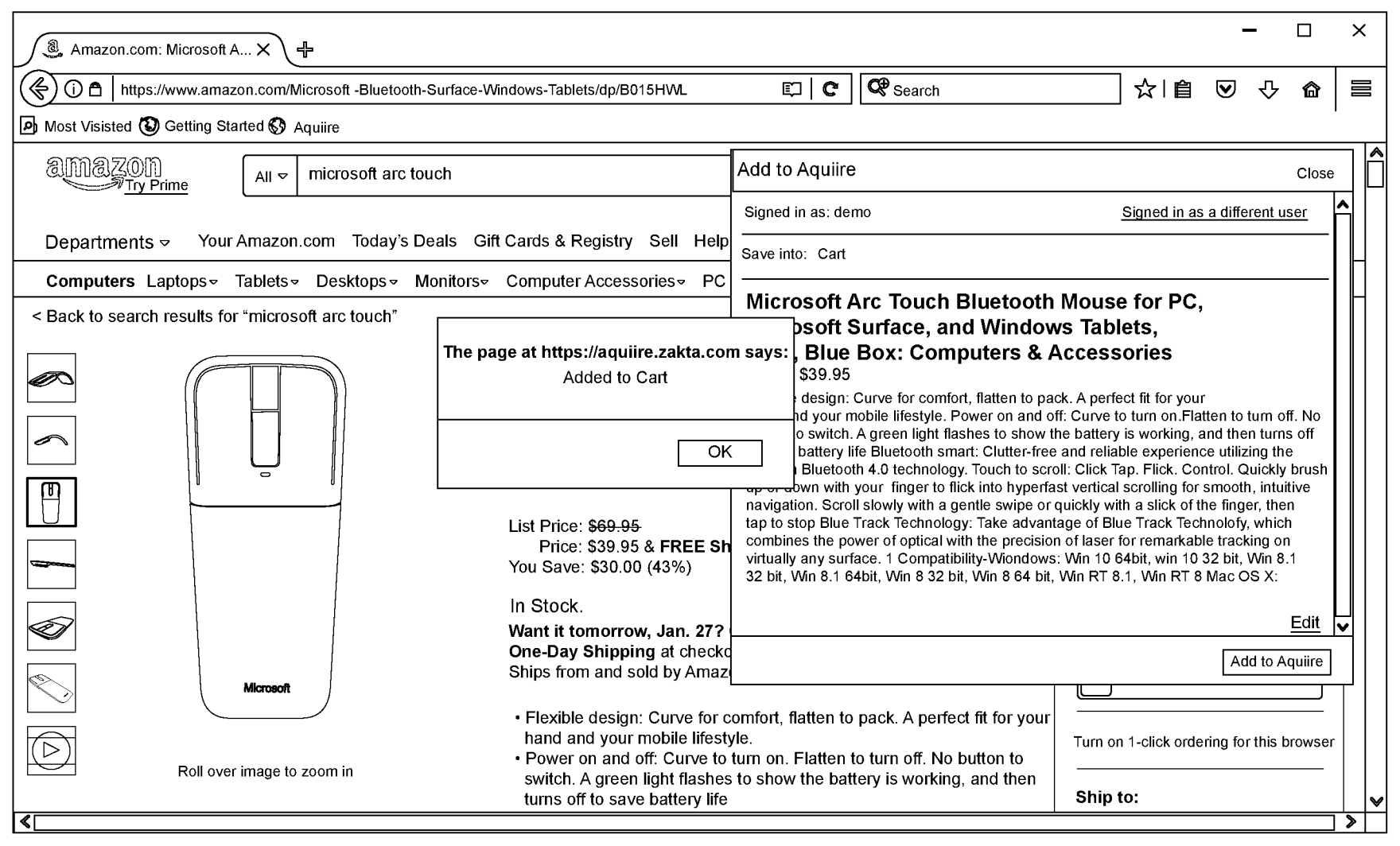

Referring to FIGS. 13A and 13B, in another embodiment, an alternative to visiting a source site through the platform is provided via an applet function which could be implemented as a bookmarklet, browser plugin or similar capability in browsers. This allows an end-user to visit any website and, upon finding an item of interest for purchase, establish a transfer of information regarding the desired item to the ARP Server. The applet may pass the URL when it is launched (selected by the end-user browsing a given site). The ARP Server may determine if a set of custom rules exists for that URL and then, in addition to porting a set of data from the original webpage into the ARP Server's shopping cart, may also launch those specific rules against the selection using JavaScript.

CONCLUSION

Thus, the provision, in real-time, of embodiments including at least one of the following features (or various combinations thereof) comprising: dual mode agents, relevance tuning, guided buying, alternative supplier checking and price dispersion analytics solves specific problems engendered by both traditional procurement systems as well as the ability of procurement systems to interact with modern supplier sources. These embodiments solve problems across the spectrum from poor, stale supplier data and high rogue spend to savings leak and lack of timely insights.

Explicit Definitions

When used in the claims, a statement that something is "based on" something else should be understood to mean that something is determined at least in part by the thing that it is indicated as being "based on." When something is required to be completely determined by a thing, it will be described as being "based EXCLUSIVELY on" the thing.

When used in the claims, "means for using asynchronous progressive requests to accommodate websites which interactively reveal data" should be understood as a means plus function limitation as provided for in 35 U.S.C. § 112(f) where the function is "using asynchronous progressive requests to accommodate websites which interactively reveal data" and the corresponding structure is a platform comprising an ARP Server (220), an agent server (230), and a grid server (240) configured as described in the discussion of those elements and their sub-elements (e.g., federator (221)).

When used in the claims, "means for using asynchronous progressive requests to accommodate multi-page hyperlinked sources" should be understood as a means plus function limitation as provided for in 35 U.S.C. § 112(f) where the function is "using asynchronous progressive requests to accommodate multi-page hyperlinked sources" and the corresponding structure is a platform comprising an ARP Server (220), an agent server (230), and a grid server (240) configured as described in the discussion of those elements and their sub-elements (e.g., federator (221)).

When used in the claims, "means for using asynchronous progressive requests to accommodate multiple multi-page hyperlinked sources" should be understood as a means plus function limitation as provided for in 35 U.S.C. § 112(f) where the function is "using asynchronous progressive requests to accommodate multiple multi-page hyperlinked sources" and the corresponding structure is a platform comprising an ARP Server (220), an agent server (230), and a grid server (240) configured as described in the discussion of those elements and their sub-elements (e.g., federator (221)).

The invention claimed is:

1. A system for dynamically integrating a procurement system with a web-based source including content associated with one or more products, comprising:
one or more memories storing software instructions, and one or more processors configured to execute the software instructions to perform operations including:
receiving a query for a product from an end-user of the procurement system;
searching, via a browser component, over a network, using one or more computerized agents, a web-based source on behalf of the procurement system to automatically capture a first set of product information from a first page of the web-based source,
wherein the first set of product information includes only one or more standardized product facets of a list of standardized product facets, the list of standardized product facets including a supplier identifier and a product price,
wherein said first page of the web-based source also comprises one or more items of additional information corresponding to one or more product facets specific to the web-based source and outside the list of standardized product facets;
automatically displaying said first set of product information in a certain page corresponding to the first page to the end-user through said procurement system;
subsequent to the displaying, receiving an indication of an interaction with the display of the first set of product information;
subsequent to receiving the indication, automatically interacting, in the background, using one or more of said computerized agents, with said first page of the web-based source to cause said web-based source to transmit the one or more items of additional information in said first page;
automatically capturing said one or more items of additional information from said first page of the web-based source;
automatically organizing said one or more items of additional information, and
automatically displaying a set of enhanced product information, including said one or more items of additional information, in the certain page in a format compatible with the procurement system regardless of the format of the product information retrieved from the web-based source.

2. The system of claim 1 wherein said web-based source is a punch-out.

3. The system of claim 1 wherein said automatically interacting step is repeated to cause said web-based source to transmit still further items of additional information in said first page and said automatically capturing and displaying steps are also repeated until a product profile, configured for said end-user with regard to the query, is complete.

4. The system of claim 3 wherein complete equals a predetermined percentage of completion.

5. The system of claim 4 wherein said first displaying step occurs before said product profile is complete.

6. The system of claim 4 wherein a complete set of product information is gathered via progressive and asynchronous communication between the procurement system and the web-based source.

7. The system of claim 4 wherein said system performs a set of progressive requests via an agent, deployed in said procurement system, that is configured with JS/JQuery scripting, via a browser node to said punch-out.

8. The system of claim 7 wherein said system achieves asynchronous communication by configuring said agent to extract at least two sets of product information that are progressively requested from said web-based source.

9. The system of claim 7 wherein:
the web-based source is one of a plurality of web-based sources; and
the system includes a federator component that reconciles at least two sets of product information extracted from at least two web-based sources from the plurality of web-based sources via a plurality of scripted agents.

10. The system of claim 1 wherein automatically displaying said set of enhanced product information, including said one or more items of additional information, comprises displaying said one or more items of additional information from said first page in a different color for a predetermined length of time.

11. The system of claim 1 wherein automatically displaying said set of enhanced product information, including said one or more items of additional information, comprises ordering one or more of said first set of product information and said one or more items of additional information from said first page according to a set of preconfigured rules-based preferences.

12. The system of claim 11 wherein said set of rules-based preferences are preconfigured to block one or more items from being displayed as part of said set of enhanced product information.

13. The system of claim 11 wherein said ordering step is based on a set of one or more weighted factors including supplier preference, supplier item relevance, category relevance, and user preference.

14. The system of claim 1 wherein the operations the one or more processors are configured to execute the software instructions to perform comprise:
based on the query for the product from the end-user of the procurement system, retrieving cached product information for one or more products from an item cache;
storing the first set of product information in a result set cache separate from the item cache; and
displaying the retrieved cached product information to the end user with the first set of product information.

15. The system of claim 1 wherein the operations the one or more processors are configured to execute the software instructions to perform comprise:
based on the query for the product from the end-user of the procurement system, retrieving punch-in product information from a punch-in catalog; and
displaying the retrieved punch-in product information to the end user with the first set of product information.

16. A computer-implemented method of dynamically integrating a procurement system with a web-based source including content associated with one or more products, comprising:
receiving a query for a product from an end-user of the procurement system;
searching, via a browser component, over a network, using one or more computerized agents, a web-based source on behalf of the procurement system to automatically capture a first set of product information from a first page of the web-based source,
wherein the first set of product information includes only one or more standardized product facets of a list of standardized product facets, the list of standardized product facets including a supplier identifier and a product price, wherein said first page of the web-based source also comprises one or more items of additional information corresponding to one or more product facets specific to the web-based source and outside the list of standardized product facets;

automatically displaying said first set of product information in a certain page corresponding to the first page to the end-user through said procurement system;

subsequent to the displaying, receiving an indication of an interaction with the display of the first set of product information;

subsequent to receiving the indication, automatically interacting, in the background, using one or more of said computerized agents, with said first page of the web-based source to cause said web-based source to transmit the one or more items of additional information in said first page;

automatically capturing said one or more items of additional information from said first page of the web-based source;

automatically organizing said one or more items of additional information, and automatically displaying a set of enhanced product information, including said one or more items of additional information, in the certain page in a format compatible with the procurement system regardless of the format of the product information retrieved from the web-based source.

17. The computer-implemented method of claim 16 wherein said web-based source is a punch-out.

18. The computer-implemented method of claim 16 wherein said automatically interacting step is repeated to cause said web-based source to transmit still further items of additional information in said first page and said automatically capturing and displaying steps are also repeated until a product profile, configured for said end-user with regard to the query, is complete.

19. The computer-implemented method of claim 18 wherein complete equals a predetermined percentage of completion.

20. The computer-implemented method of claim 19 wherein said first displaying step occurs before said product profile is complete.

21. The computer-implemented method of claim 19 wherein a complete set of product information is gathered via progressive and asynchronous communication between the procurement system and the web-based source.

22. The computer-implemented method of claim 19 wherein said system performs a set of progressive requests via an agent, deployed in said procurement system, that is configured with JS/JQuery scripting, via a browser node to said punch-out.

23. The computer-implemented method of claim 22 wherein said system achieves asynchronous communication by configuring said agent to extract at least two sets of product information that are progressively requested from said web-based source.

24. The computer-implemented method of claim 22 wherein:

the web-based source is one of a plurality of web-based sources; and further comprising reconciling at least two sets of product information extracted from at least two web-based sources from the plurality of web-based sources via a plurality of scripted agents.

25. The computer-implemented method of claim 16 wherein automatically displaying said set of enhanced product information, including said one or more items of additional information, comprises displaying said one or more items of additional information from said first page in a different color for a predetermined length of time.

26. The computer-implemented method of claim 16 wherein automatically displaying said set of enhanced product information, including said one or more items of additional information, comprises ordering one or more of said first set of product information and said one or more items of additional information from said first page according to a set of preconfigured rules-based preferences.

27. The computer-implemented method of claim 16 further comprising:

based on the query for the product from the end-user of the procurement system, retrieving cached product information for one or more products from an item cache;

storing the first set of product information in a result set cache separate from the item cache; and displaying the retrieved cached product information to the end user with the first set of product information.

28. The computer-implemented method of claim 16 further comprising:

based on the query for the product from the end-user of the procurement system, retrieving punch-in product information from a punch-in catalog; and displaying the retrieved punch-in product information to the end user with the first set of product information.

* * * * *